(12) United States Patent
Yamada

(10) Patent No.: US 11,545,153 B2
(45) Date of Patent: Jan. 3, 2023

(54) INFORMATION PROCESSING DEVICE, INFORMATION PROCESSING SYSTEM, AND INFORMATION PROCESSING METHOD, AND PROGRAM

(71) Applicant: Sony Corporation, Tokyo (JP)

(72) Inventor: Keiichi Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 170 days.

(21) Appl. No.: 17/045,456

(22) PCT Filed: Mar. 12, 2019

(86) PCT No.: PCT/JP2019/010022
§ 371 (c)(1),
(2) Date: Oct. 5, 2020

(87) PCT Pub. No.: WO2019/198405
PCT Pub. Date: Oct. 17, 2019

(65) Prior Publication Data
US 2021/0174809 A1 Jun. 10, 2021

(30) Foreign Application Priority Data
Apr. 12, 2018 (JP) .............................. JP2018-076968

(51) Int. Cl.
*G10L 15/30* (2013.01)
*G10L 15/18* (2013.01)
(Continued)

(52) U.S. Cl.
CPC ............ *G10L 15/30* (2013.01); *G06V 40/161* (2022.01); *G10L 15/1815* (2013.01); *G10L 15/22* (2013.01); *G10L 2015/223* (2013.01)

(58) Field of Classification Search
USPC ...................................................... 704/1–504
See application file for complete search history.

(56) References Cited

U.S. PATENT DOCUMENTS 6,151,571 A * 11/2000 Pertrushin ............... G10L 17/26
704/207
6,275,806 B1 * 8/2001 Pertrushin ............... G10L 17/26
704/E17.002
(Continued)

FOREIGN PATENT DOCUMENTS

JP H11-24694 A 1/1999
JP 2001-067098 A 3/2001
(Continued)

OTHER PUBLICATIONS

International Search Report and Written Opinion and English translations thereof dated May 7, 2019 in connection with International Application No. PCT/JP2019/010022.
(Continued)

*Primary Examiner* — Marcus T Riley
(74) *Attorney, Agent, or Firm* — Wolf, Greenfield & Sacks, P.C.

(57) ABSTRACT

Provided is a device, a method that allow a remote terminal to perform a process on the basis of a local-terminal-side user utterance. There are a local terminal and a remote terminal. The local terminal performs a process of a semantic analysis of a user utterance input into the local terminal. On the basis of a result of the semantic analysis, the local terminal determines whether or not the user utterance is a request to the remote terminal for a process. Moreover, in a case where the user utterance is a request to the remote terminal for a process, the local terminal transmits the result of the semantic analysis by a semantic-analysis part to the remote terminal. The remote terminal receives the result of the semantic analysis of the local-terminal-side user utterance, and performs a process based on the received result of the semantic analysis of the local-terminal-side user utterance.

14 Claims, 14 Drawing Sheets

(51) Int. Cl.
*G10L 15/22* (2006.01)
*G06V 40/16* (2022.01)

(56) References Cited

U.S. PATENT DOCUMENTS

| | | | | |
|---|---|---|---|---|
| 7,426,467 | B2* | 9/2008 | Nashida | H04N 21/4828 |
| | | | | 725/38 |
| 7,590,538 | B2* | 9/2009 | St. John | H04M 7/006 |
| | | | | 704/270.1 |
| 7,940,914 | B2* | 5/2011 | Petrushin | G10L 17/26 |
| | | | | 379/265.06 |
| 8,965,770 | B2* | 2/2015 | Petrushin | G10L 17/26 |
| | | | | 704/270.1 |
| 9,495,331 | B2* | 11/2016 | Govrin | G10L 13/08 |
| 9,892,208 | B2* | 2/2018 | Anastasakos | G06F 40/20 |
| 10,522,145 | B2* | 12/2019 | Ogawa | A61B 1/00183 |
| 11,020,860 | B2* | 6/2021 | Cheuvront | G07C 5/0808 |
| 11,120,792 | B2* | 9/2021 | Kim | H04M 1/72454 |
| 2001/0056349 | A1* | 12/2001 | St. John | G07C 9/37 |
| | | | | 704/270 |
| 2002/0002460 | A1* | 1/2002 | Pertrushin | H04M 3/533 |
| | | | | 704/E17.002 |
| 2002/0002464 | A1* | 1/2002 | Petrushin | G10L 17/26 |
| | | | | 704/275 |
| 2002/0010587 | A1* | 1/2002 | Pertrushin | G10L 17/26 |
| | | | | 704/275 |
| 2003/0023444 | A1* | 1/2003 | St. John | H04M 3/493 |
| | | | | 704/E15.044 |
| 2003/0033145 | A1* | 2/2003 | Petrushin | G10L 17/26 |
| | | | | 704/236 |
| 2011/0112836 | A1* | 5/2011 | Kurki-Suonio | H04M 3/42221 |
| | | | | 704/235 |
| 2011/0112837 | A1* | 5/2011 | Kurki-Suonio | G10L 15/22 |
| | | | | 704/235 |
| 2011/0178803 | A1* | 7/2011 | Petrushin | G10L 17/26 |
| | | | | 704/E11.001 |
| 2014/0047001 | A1* | 2/2014 | Phillips | H04L 67/141 |
| | | | | 709/202 |
| 2014/0297268 | A1* | 10/2014 | Govrin | G06N 5/04 |
| | | | | 704/9 |
| 2015/0286747 | A1* | 10/2015 | Anastasakos | G06F 40/40 |
| | | | | 707/776 |
| 2017/0053648 | A1* | 2/2017 | Chi | G02B 27/017 |
| 2017/0186428 | A1* | 6/2017 | Kunitake | G10L 17/06 |
| 2017/0206243 | A1* | 7/2017 | Ono | G06F 16/24578 |
| 2017/0361468 | A1* | 12/2017 | Cheuvront | G06F 3/01 |
| 2018/0025727 | A1* | 1/2018 | Kume | G10L 17/22 |
| | | | | 704/275 |
| 2018/0068103 | A1* | 3/2018 | Pitkänen | G06Q 20/40145 |
| 2019/0057696 | A1* | 2/2019 | Ogawa | G10L 15/1815 |
| 2019/0279632 | A1* | 9/2019 | Kim | G06F 3/0482 |
| 2021/0174809 | A1* | 6/2021 | Yamada | G10L 15/1815 |
| 2021/0260773 | A1* | 8/2021 | Cheuvront | G06F 3/01 |

FOREIGN PATENT DOCUMENTS

| | | |
|---|---|---|
| JP | 2006-251266 A | 9/2006 |
| JP | 2017-117371 A | 6/2017 |
| JP | 2018-013545 A | 1/2018 |

OTHER PUBLICATIONS

International Preliminary Report on Patentability and English translation thereof dated Oct. 22, 2020 in connection with International Application No. PCT/JP2019/010022.

* cited by examiner

INFORMATION PROCESSING DEVICE, INFORMATION PROCESSING SYSTEM, AND INFORMATION PROCESSING METHOD, AND PROGRAM

CROSS-REFERENCE TO RELATED APPLICATIONS

This is a U.S. National Stage Application under 35 U.S.C. § 371, based on International Application No. PCT/JP2019/010022, filed in the Japanese Patent Office as a Receiving Office on Mar. 12, 2019, entitled "INFORMATION PROCESSING DEVICE, INFORMATION PROCESSING SYSTEM, INFORMATION PROCESSING METHOD AND PROGRAM", which claims priority under 35 U.S.C. § 119(a)-(d) or 35 U.S.C. § 365(b) to Japanese Patent Application Number JP2018-076968, filed in the Japanese Patent Office on Apr. 12, 2018, each of which applications is hereby incorporated by reference in its entirety.

TECHNICAL FIELD

The present disclosure relates to an information processing device, an information processing system, and an information processing method, and a program. More specifically, the present disclosure relates to an information processing device, an information processing system, and an information processing method, and a program that allow a local terminal and a remote terminal to perform processes based on user utterances.

BACKGROUND ART

Use of voice recognition systems that perform voice recognition of user utterances, and perform various processes and responses based on results of the recognition has increased recently.

The voice recognition system recognizes and understands user utterances input through a microphone, and performs processes that accord with the user utterances.

For example, in a case where a user makes an utterance "Tell me tomorrow's weather", the voice recognition system obtains weather information from a weather-information providing server, generates a system response based on the obtained information, and outputs the generated response from a speaker. Specifically, for example, a system utterance="It will be nice weather tomorrow. However, there is likely to be a thunderstorm in the evening" such a system utterance is output.

Note that a conventional technique that discloses the voice recognition process is, for example, Patent Document 1 (Japanese Patent Application Laid-Open No. 2008-146054).

Use of smart speakers or agent devices used as terminals that perform processes and responses based on results of voice recognition of user utterances has increased recently.

However, it is difficult for a user who is unfamiliar with operation of information processing devices, such as the aged and the like, to sufficiently use such a device.

For example, it is often difficult for the aged to perform setting and everyday maintenance and operation of an agent device although it is intended that the agent device is disposed in a remote home (parents' home) where aged relatives live.

In a case where an agent device disposed at a remote place where the aged lives is operated, processes, such as instructing the aged who lives at the remote place by telephone or the like in how to operate the agent device to have the aged directly operate the agent device, may be possible. However, it is highly likely that the aged cannot operate it well. The circumstances are similar to circumstances where the aged makes an inquiry regarding a PC or an information device, and the inquiry cannot be easily solved well even though a support desk staff member verbally explains to the aged how to operate the PC or the information device.

CITATION LIST

Patent Document

Patent Document 1: Japanese Patent Application Laid-Open No. 2008-146054

SUMMARY OF THE INVENTION

Problems to be Solved by the Invention

The present disclosure is made, considering, for example, the problems described above. It is an object of the present disclosure to provide an information processing device, an information processing system, and an information processing method, and a program that allow a local terminal that communicates with a remote terminal at a remote place to be used to make the remote terminal perform processes based on user utterances of a local-side user.

Solutions to Problems

A first aspect of the present disclosure is
an information processing device including:
a semantic-analysis part that performs a process of a semantic analysis of a user utterance; and
a part that determines a terminal that is an object of operation, the part that determines a terminal that is an object of operation determining, on the basis of a semantic-analysis result generated by the semantic-analysis part, whether or not the user utterance requests a process from the information processing devices, and in a case where the user utterance requests a process from the information processing devices, determining which of the information processing devices from which the user utterance requests the process.

Moreover, a second aspect of the present disclosure is
an information processing system including a local terminal and a remote terminal,
in which the local terminal includes:
a semantic-analysis part that performs a process of a semantic analysis of a user utterance input into the local terminal;
a part that determines a terminal that is an object of operation, the part that determines a terminal that is an object of operation determining, on the basis of a semantic-analysis result generated by the semantic-analysis part, whether or not the user utterance requests a process from the remote terminal; and
a communication unit that, in a case where it is determined that the user utterance requests a process from the remote terminal, transmits the result of the semantic analysis by the semantic-analysis part to the remote terminal, and
the remote terminal includes:
a communication unit that receives the result of the semantic analysis of the local-terminal-side user utterance; and an application executing part that performs a process based on the result of the semantic analysis of the local-terminal-side user utterance that has been received through the communication unit.

Moreover, a third aspect of the present disclosure is an information processing method that is performed in an information processing device, and in which a semantic-analysis part performs a process of a semantic analysis of a user utterance; and a part that determines a terminal that is an object of operation determines, on the basis of a semantic-analysis result generated by the semantic-analysis part, whether or not the user utterance requests a process from the information processing devices, and in a case where the user utterance requests a process from the information processing devices, determines which of the information processing devices from which the user utterance requests the process.

Moreover, a fourth aspect of the present disclosure is an information processing method that is performed in an information processing system including a local terminal and a remote terminal, and in which the local terminal:

performs a process of a semantic analysis of a user utterance input into the local terminal;

performs a process of determining a terminal that is an object of operation, the process of determining a terminal that is an object of operation determining, on the basis of a semantic-analysis result of the semantic-analysis process, whether or not the user utterance requests a process from the remote terminal; and in a case where it is determined that the user utterance requests a process from the remote terminal, performs a process of transmitting the result of the semantic analysis by the semantic-analysis part to the remote terminal, and the remote terminal:

receives the result of the semantic analysis of the local-terminal-side user utterance; and performs a process based on the result of the semantic analysis of the local-terminal-side user utterance that has been received.

Moreover, a fifth aspect of the present disclosure is a program that makes an information processing device perform information processing, the program:

making a semantic-analysis part perform a process of a semantic analysis of a user utterance; and making a part that determines a terminal that is an object of operation perform processes of determining, on the basis of a semantic-analysis result generated by the semantic-analysis part, whether or not the user utterance requests a process from the information processing devices, and in a case where the user utterance requests a process from the information processing devices, determining which of the information processing devices from which the user utterance requests the process.

Note that the program of the present disclosure is, for example, a computer readable program provided by storage media, communication media to an information processing device or a computer system that executes various program codes. By providing such a computer readable program, a process according to the program is performed on the information processing device or the computer system.

Other objects, features, and advantages of the present disclosure are shown in a more detailed explanation based on embodiments of the present disclosure that will be described later and accompanying drawings. Note that the system in the present description is a logical combined configuration of a plurality of devices, and is not limited to a system that includes devices that are each a configuration and are in one housing.

Effects of the Invention

A configuration of an embodiment of the present disclosure provides a device, a method that allow a remote terminal to perform a process on the basis of a local-terminal-side user utterance.

Specifically, there are, for example, a local terminal and a remote terminal. The local terminal performs a process of a semantic analysis of a user utterance input into the local terminal. On the basis of a result of the semantic analysis, the local terminal determines whether or not the user utterance is a request to the remote terminal for a process. Moreover, in a case where the user utterance is a request to the remote terminal for a process, the local terminal transmits the result of the semantic analysis by a semantic-analysis part to the remote terminal. The remote terminal receives the result of the semantic analysis of the local-terminal-side user utterance, and performs a process based on the received result of the semantic analysis of the local-terminal-side user utterance.

The present configuration provides a device, a method that allow a remote terminal to perform a process on the basis of a local-terminal-side user utterance.

Note that effects described in the present description are absolutely illustrative and not limitative. Additional effects may be.

MODE FOR CARRYING OUT THE INVENTION

Hereinafter, an information processing device, an information processing system, and an information processing method, and a program of the present disclosure will be explained in detail with reference to the drawings. Note that the explanation will be given in order of the following items.
1. AS TO SUMMARY OF PROCESSES PERFORMED BY INFORMATION PROCESSING DEVICE
2. AS TO CONFIGURATION EXAMPLE OF INFORMATION PROCESSING DEVICE
3. AS TO PROCESS SEQUENCE PERFORMED BY INFORMATION PROCESSING DEVICE
4. AS TO SPECIFIC EXAMPLE OF PROCESSES OF DETERMINING WHETHER OR NOT USER UTTERANCE REQUESTS PROCESS FROM TERMINALS, AND DETERMINING WHICH OF TERMINALS FROM WHICH USER UTTERANCE REQUESTS PROCESS
5. AS TO PROCESS OF CONTROLLING OUTPUT OF PRIVACY INFORMATION AND SECURITY INFORMATION
6. AS TO EXAMPLE OF PROCESS OF SETTING TERMINAL, PROCESS OF INFORMATION REGISTRATION OF TERMINAL
7. AS TO CONFIGURATION EXAMPLE OF HARDWARE OF INFORMATION PROCESSING DEVICE
8. SUMMARY OF CONFIGURATIONS OF THE PRESENT DISCLOSURE

[1. As to Summary of Processes Performed by Information Processing Device]

First, a summary of processes performed by an information processing device of the present disclosure will be explained with reference to FIG. 1 and some of the drawings.

Figure 1:
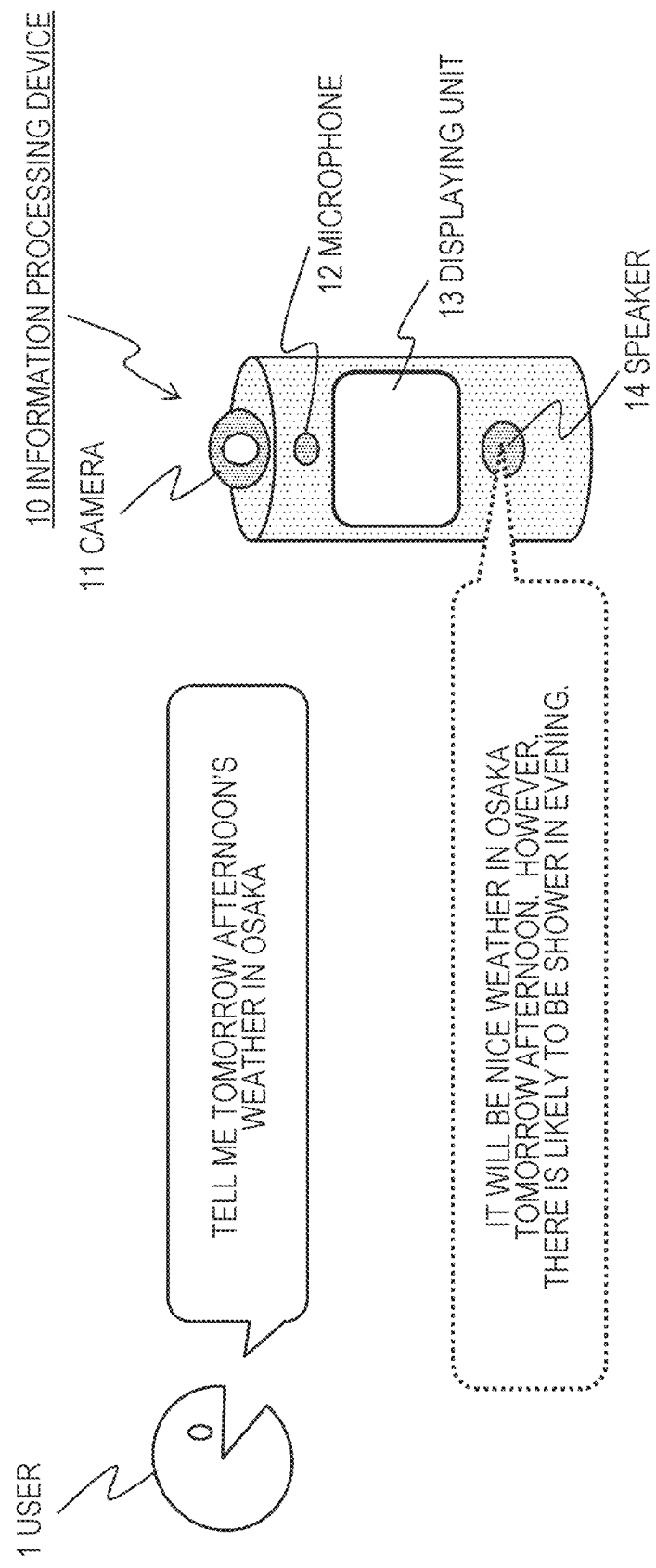
FIG. 1 is a diagram that illustrates a specific example of processes of an information processing device of responding to a user utterance.

FIG. 1 is a drawing that illustrates an example of processes of an information processing device 10 of recognizing a user utterance made by a user 1 and responding to the user utterance.

The information processing device 10 performs a process of voice recognition of, for example,
a user utterance="Tell me tomorrow afternoon's weather in Osaka".

Moreover, the information processing device 10 performs processes based on a result of the voice recognition of the user utterance.

In the example illustrated in FIG. 1, the information processing device 10 obtains data to respond to the user utterance="Tell me tomorrow afternoon's weather in Osaka", generates a response on the basis of the obtained data, and outputs the generated response through a speaker 14.

In the example illustrated in FIG. 1, the information processing device 10 performs the following system response.

A system response="It will be nice weather in Osaka tomorrow afternoon. However, there is likely to be a shower in the evening".

The information processing device 10 performs a voice synthesizing process (text-to-speech (TTS)) to generate and output the system response described above.

The information processing device 10 generates and outputs the response by using knowledge data obtained from a storage unit within the device or knowledge data obtained through networks.

The information processing device 10 illustrated in FIG. 1 includes a camera 11, a microphone 12, a displaying unit 13, and the speaker 14. The information processing device 10 illustrated in FIG. 1 has a configuration that allows voice input and output and image input and output.

The information processing device 10 illustrated in FIG. 1 is referred to as, for example, a smart speaker or an agent device.

Figure 2:
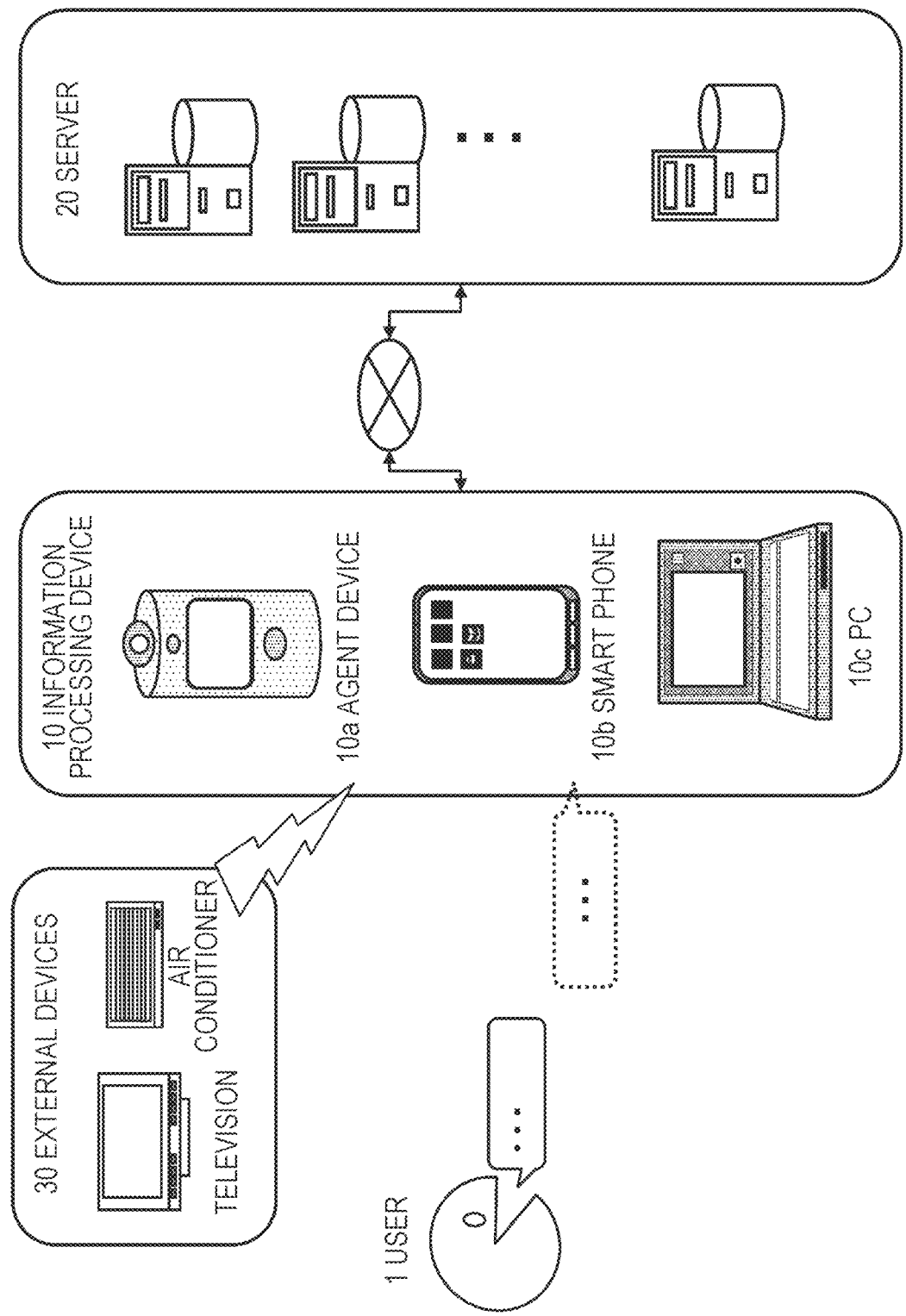
FIG. 2 is a diagram that illustrates a configuration example and a use example of the information processing device.

As illustrated in FIG. 2, the information processing device 10 of the present disclosure is not limited to an agent device 10a but may include various forms of devices, such as a smart phone 10b, a personal computer (PC) 10c, and the like.

In addition to recognizing an utterance of the user 1 and making a response based on the user utterance, the information processing device 10 performs, for example, control of external devices 30 illustrated in FIG. 2, such as a television, an air conditioner, and the like according to the user utterance.

In a case where a user utterance is, for example, such a request as "Change the television channel to one" or "Set a temperature of the air conditioner to 20 degrees", the information processing device 10 outputs a control signal (Wi-Fi, infrared rays, or the like) to the external device 30 on the basis of a result of voice recognition of the user utterance to control the external device 30 according to the user utterance.

Note that the information processing device 10 may be connected with a server 20 through networks, and may obtain, from the server 20, information necessary to generate a response to a user utterance. Furthermore, the information processing device 10 may be configured to make the server perform a voice recognition process and a semantic-analysis process.

Use of smart speakers or agent devices used as the information processing device 10 explained with reference to FIGS. 1 and 2 has increased recently. However, as described above, it is difficult for a user who is unfamiliar with operation of information processing devices, such as the aged and the like, to sufficiently use such a device. For example, it may be difficult for the aged to perform setting and everyday maintenance and operation of an agent device although it is intended that the agent device is disposed in a remote home (parents' home) where aged parents live.

The present disclosure is a solution to such a problem. The present disclosure allows an agent device at hand (local terminal) that communicates with an agent device at a remote place (remote terminal) to be used to make the remote terminal perform various processes while a videophone conversation is performed between the local terminal and the remote terminal.

An example of processes performed by a configuration of the present disclosure will be explained with reference to FIG. 3.

Figure 3:
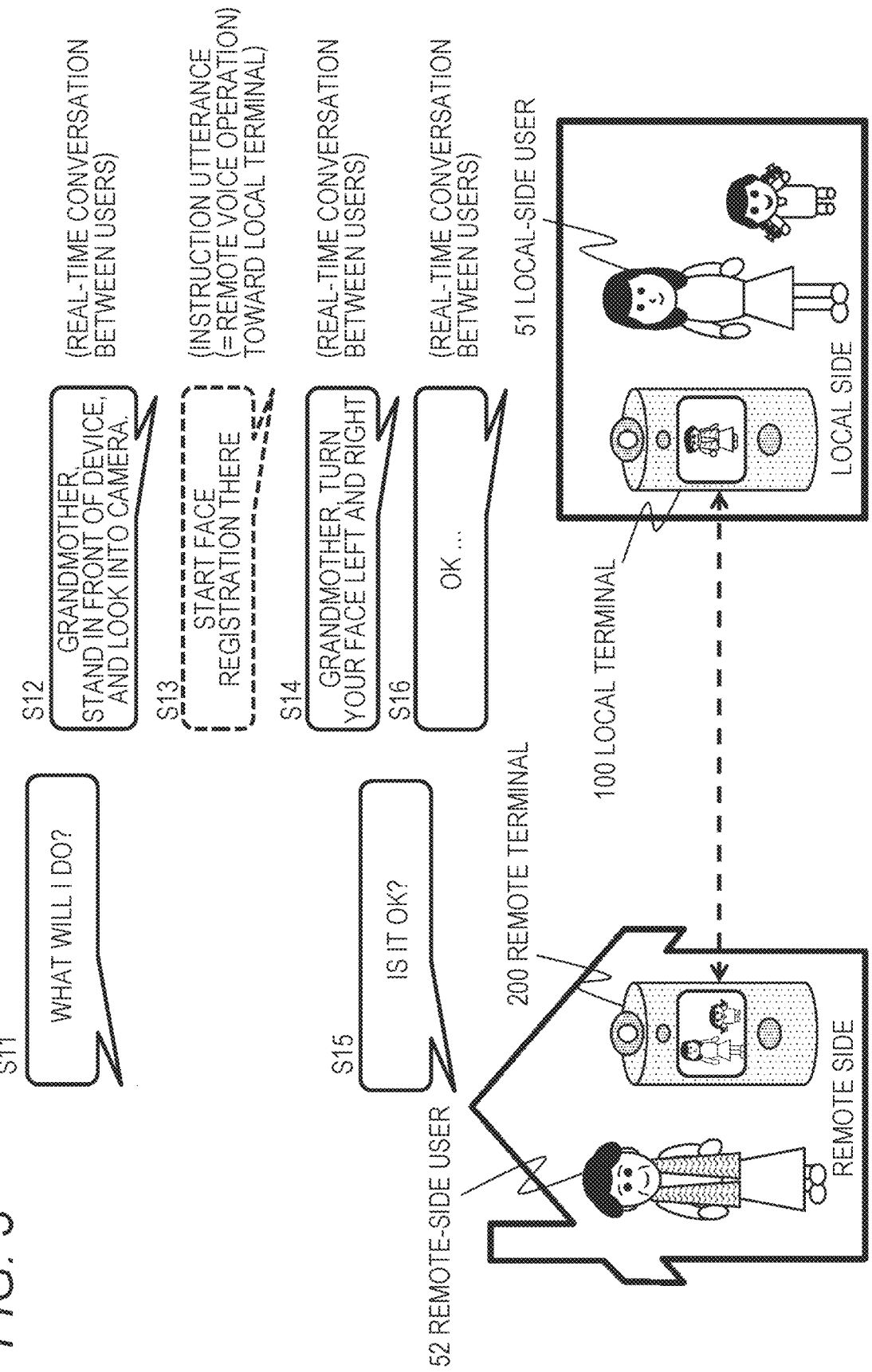
FIG. 3 is a diagram that illustrates a summary of processes performed by the information processing device of the present disclosure.

A lower part of FIG. 3 illustrates a local side on the right, and a remote side on the left. On the local side, a local-side user 51 and a local terminal 100 are. On the other hand, on the remote side, a remote-side user 52 and a remote terminal 200 are.

The local terminal 100 and the remote terminal 200 each have a configuration similar to the configuration of the information processing device 10 that has been explained with reference to FIGS. 1 and 2. The local terminal 100 and the remote terminal 200 each include a camera 11, a microphone 12, a displaying unit 13, and a speaker 14. The local terminal 100 and the remote terminal 200 are each a device that performs voice input and output and image input and output, and performs a voice recognition process. Moreover, these terminals communicate with each other. For example, the terminals communicate data with each other through the Internet or the like.

The remote-side user 52 on the remote side is a user unfamiliar with operation of the remote terminal 200.

FIG. 3 illustrates user utterances toward the local terminal 100 and the remote terminal 200 in time series. The user utterances are illustrated as user utterances of steps S11 to S16. Hereinafter, these utterances will be explained in order.

Note that images and voices are mutually transmitted and received between the local terminal 100 and the remote terminal 200. A videophone conversation is performed between the local terminal 100 and the remote terminal 200.

(Step S11)

First, the remote-side user 52 makes a following user utterance toward the local-side user 51 displayed in the displaying unit of the remote terminal 200.

A remote-side user utterance=What will I do?

The user utterance is obtained by the microphone of the remote terminal 200, transmitted to the local terminal 100, and output through the speaker of the local terminal 100.

(Step S12)

Next, the local-side user 51 makes a following user utterance toward the remote-side user 52 displayed in the displaying unit of the local terminal 100.

A local-side user utterance=Grandmother, stand in front of the device, and look into the camera The user utterance is obtained by the microphone of the local terminal 100, transmitted to the remote terminal 200, and output through the speaker of the remote terminal 200.

According to the local-side user utterance, the remote-side user 52 stands in front of the device, and looks into the camera.

(Step S13)

Next, the local-side user 51 makes a following user utterance that is an instruction utterance (=remote voice operation) toward the local terminal 100.

A local-side user utterance=Start face registration there

The user utterance is obtained by the microphone of the local terminal 100, and transmitted to the remote terminal 200. According to the user utterance, the remote terminal 200 starts a process of registration of a face of the remote-side user 52 who is currently being captured with the camera.

Note that the face registration process is a process of registration of a face image captured by the terminal in a storage unit. Performing the face registration process stores a face image captured with the camera in a storage unit of the remote terminal 200. In the storage unit, the face image is related to a predetermined user identification (ID).

Note that in the process, the local terminal 100 needs to identify whether the user utterance is an utterance toward the remote-side user 52 or an operational instruction toward the remote terminal 200.

The identification is performed by analyzing the user utterance. For example, in a case where the user utterance contains a preliminarily specified utterance (word), such as "there", "remote", or "face registration", the local terminal 100 determines that the user utterance is an operational instruction toward the remote terminal 200.

The user utterance of step S13 contains expressions (words), such as "there" and "face registration", and the local terminal 100 determines that the user utterance is an operational instruction toward the remote terminal 200. The local terminal 100 transmits the operational instruction, or more specifically, a result of a semantic analysis of the user utterance, to the remote terminal 200. According to intent of the user utterance contained in the received result of a semantic analysis, the remote terminal 200 performs a process based on the user utterance. That is to say, the remote terminal 200 starts a process of registration of a face of the remote-side user 52 who is currently being captured with the camera.

Note that user utterances and images of captured users during communication between the local terminal 100 and the remote terminal 200 are transmitted and received between the terminals, and output through the speakers and the displaying units of the receiving terminals. That is to say, a conversation between users is performed between the terminals, similarly as videophones. In parallel with the conversation, various processes, such as processes of analyzing operational instructions toward the terminals, a face registration process by the terminals, and the like, are performed.

(Step S14)

Moreover, the local-side user 51 makes a following user utterance toward the remote-side user 52 displayed in the displaying unit of the local terminal 100.

A local-side user utterance=Grandmother, turn your face left and right

The user utterance is obtained by the microphone of the local terminal 100, transmitted to the remote terminal 200, and output through the speaker of the remote terminal 200.

According to the local-side user utterance, the remote-side user 52 turns her face left and right.

(Step S15)

Next, the remote-side user 52 makes a following user utterance toward the local-side user 51 displayed in the displaying unit of the remote terminal 200.

A remote-side user utterance=Is it OK?

The user utterance is obtained by the microphone of the remote terminal 200, transmitted to the local terminal 100, and output through the speaker of the local terminal 100.

(Step S16)

Next, the local-side user 51 makes a following user utterance toward the remote-side user 52 displayed in the displaying unit of the local terminal 100.

A local-side user utterance=OK

The user utterance is obtained by the microphone of the local terminal 100, transmitted to the remote terminal 200, and output through the speaker of the remote terminal 200.

Due to a series of the user utterances and the conversation, on the remote side, the remote terminal 200 performs the process of registration of a face of the remote-side user 52.

Even in a case where the remote-side user 52 does not know how to do the face registration process, a successful face registration process is performed.

As described above, the processes of the present disclosure allow a videophone real-time conversation using agent devices and voice operation toward a remote terminal at a remote place to be simultaneously performed.

[2. As to Configuration Example of Information Processing Device]

Next, a specific configuration example of the information processing devices of the present disclosure, that is to say the local terminal 100 and the remote terminal 200 that have been explained with reference to FIG. 3 will be explained with reference to FIG. 4.

Figure 4:
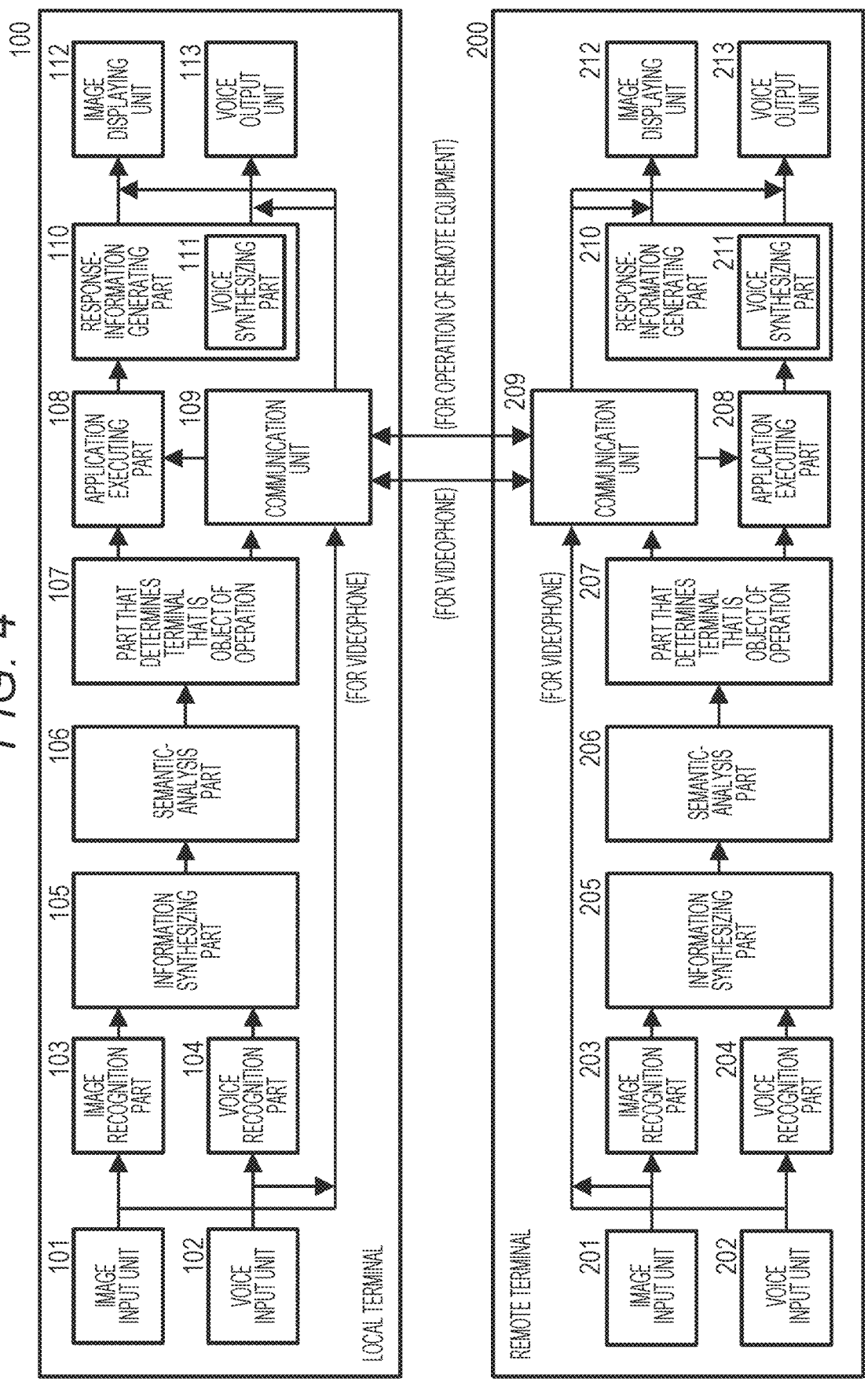
FIG. 4 is a diagram that illustrates a configuration example of the information processing device.

FIG. 4 is a block diagram that illustrates a configuration of the local terminal 100 and the remote terminal 200.

As illustrated in FIG. 4, the local terminal 100 and the remote terminal 200 have similar configurations.

The local terminal 100 includes an image input unit 101, a voice input unit 102, an image recognition part 103, a voice recognition part 104, an information synthesizing part 105, a semantic-analysis part 106, a part 107 that determines a terminal that is an object of operation, an application executing part 108, a communication unit 109, a response-information generating part 110, a voice synthesizing part 111, an image displaying unit 112, and a voice output unit 113.

The remote terminal 200 includes an image input unit 201, a voice input unit 202, an image recognition part 203, a voice recognition part 204, an information synthesizing part 205, a semantic-analysis part 206, a part 207 that determines a terminal that is an object of operation, an application executing part 208, a communication unit 209, a response-information generating part 210, a voice synthesizing part 211, an image displaying unit 212, and a voice output unit 213.

The local terminal 100 and the remote terminal 200 have the same configuration. Therefore, hereinafter, components of the local terminal 100 will be explained as an example.

The image input unit 101 includes a camera that takes in image signals. The image input unit 101 includes, for example, a web camera (that has video graphics array (VGA) or more).

The image recognition part 103 performs an analysis of camera-captured image signals input from the image input unit 101. For example, the image recognition part 103 detects, identifies, and estimates information regarding humans (users) in the captured images. Note that the image recognition part 103 includes a "face-area detection part" that detects a face area in an image, a "face identification part" that identifies a face in a face-area image, a "face-orientation estimating part" that estimates an orientation of the face in the face-area image relative to the camera, and a "line-of-sight-direction estimating part" that estimates a direction of a line-of-sight in the face-area image relative to the camera. Note that a face identification process by the "face identification part" that identifies a face identifies a face by a process of comparing the face with face images that have been preliminarily registered and stored in the storage unit. In a case where a face contained in a captured image does not match the registered faces, a result that the face is not identified is output.

The voice input unit 102 includes a microphone that takes in sound (voice) signals. The voice input unit 102 includes, for example, a microphone array that uses four or more channels.

The voice recognition part 104 converts a voice signal input from the voice input unit 102 into text information that corresponds to utterance contents of the voice signal. The voice recognition part 104 has, for example, an automatic-speech-recognition (ASR) function, and converts voice data into text data that contains a plurality of words. The voice recognition part 104 includes a "sound-source-direction estimating part" that estimates a direction (relative to the microphone array) of a sound source of each signal of a plurality of sound (voice) signals input into the macrophone array, a "voice-section detection part" that detects sections of the input sound (voice) signals where voices exist (estimates start times and end times of the sections), and a "sound-source extraction part" that extracts a voice signal that corresponds to a sound-source direction and a voice section, on the basis of information on the sound-source direction and the voice section (a signal emitted from the sound source).

An image recognition result generated by the image recognition part 103 is input into the information synthesizing part 105. That is to say, an image analysis result that contains information on an identity of a face in a face image contained in a captured image, an orientation of the face, and a line-of-sight direction is input into the information synthesizing part 105. Moreover, a voice recognition result generated by the voice recognition part 104 is input into the information synthesizing part 105. That is to say, a voice recognition result that contains a direction and a voice section of an input voice signal, a voice signal, and the like is input into the information synthesizing part 105. On the basis of the input information, the information synthesizing part 105 performs a process of integrating each piece of input information into information on each user (human).

Text information that corresponds to a user utterance is input into the semantic-analysis part 106. The text information that corresponds to a user utterance is a voice recognition result of the voice recognition part 105. The semantic-analysis part 106 uses a technique, such as natural language processing or the like, to analyze a meaning of the utterance intended by the user. The semantic-analysis part 106 has a natural language understanding function, such as natural language understanding (NLU) or the like. From text data, the semantic-analysis part 106 estimates intent of a user utterance and entity information (entity). The entity information (entity) includes meaningful elements (significant elements) contained in the utterance.

A specific example will be explained. For example, a following user utterance is input.

A user utterance=Tell me tomorrow afternoon's weather in Osaka

The user utterance has intent to know the weather, and entity information (entity) that contains words that are Osaka, tomorrow, and afternoon.

If intent and entity information (entity) are correctly estimated and obtained from a user utterance, a correct process is performed for the user utterance.

For example, in the example described above, tomorrow afternoon's weather in Osaka is obtained and output as a response.

A result of an analysis by the semantic-analysis part 106, that is to say utterance intent of a user utterance, a result of a semantic analysis of the user utterance is input into the part 107 that determines a terminal that is an object of operation. On the basis of the input information, the part 107 that determines a terminal that is an object of operation determines whether a terminal that is an object of operation in the user utterance is the local terminal or the remote terminal, or is neither the local terminal nor the remote terminal.

In a case where it is determined that a terminal that is an object of operation in a user utterance is the local terminal, intent of the user utterance, a result of a semantic analysis of the user utterance that are a result of an analysis by the semantic-analysis part 106 are output into the subsequent application executing part 108.

Furthermore, in a case where it is determined that a terminal that is an object of operation in a user utterance is the remote terminal, intent of the user utterance, a result of a semantic analysis of the user utterance that are a result of an analysis by the semantic-analysis part 106 are output into the subsequent communication unit 109.

Moreover, in a case where it is determined that a terminal that is an object of operation in a user utterance is neither the local terminal nor the remote terminal, intent of the user utterance, a result of a semantic analysis of the user utterance that are a result of an analysis by the semantic-analysis part 106 in addition to a result of a determination that determines that the user utterance is not an utterance toward the terminals are output into the application executing part 108.

The intent of the user utterance, the result of a semantic analysis of the user utterance that are a result of an analysis by the semantic-analysis part 106 are input into the application executing part 108, and the application executing part 108 executes an application according to the intent of the user utterance. Alternatively, in addition to the intent of the user utterance, the result of a semantic analysis of the user utterance that are a result of an analysis by the semantic-analysis part 106, the result of a determination that determines that the user utterance is not an utterance toward the terminals are input into the application executing part 108, and the application executing part 108 executes an application according to the intent of the user utterance.

Specifically, in a case where a terminal that is an object of operation in a user utterance is the local terminal 100, and the user utterance is, for example, an utterance that asks about weather forecast, the application executing part 108 obtains weather forecast information from a weather-information providing server. Furthermore, in a case where a terminal that is an object of operation in a user utterance is the local terminal 100, and the user utterance is, for example, an utterance that requests face registration, the application executing part 108 starts a process of registration of a face contained in a camera-captured image.

Furthermore, in a case where it is determined that a terminal that is an object of operation in a user utterance is neither the local terminal nor the remote terminal, and a result of a determination that determines that the user utterance is not an utterance toward the terminals is input into the application executing part 108, the application executing part 108 does not perform any process.

In a case where the part 107 that determines a terminal that is an object of operation determines that a terminal that is an object of operation in a user utterance is the remote terminal, intent of the user utterance, a result of a semantic analysis of the user utterance that are a result of an analysis by the semantic-analysis part 106 are input into the communication unit 109. The communication unit 109 transmits the input information to the remote terminal 200.

Moreover, the communication unit 109 receives information transmitted from the remote terminal 200, and outputs the received information into the application executing part 108 of the local terminal 100.

Furthermore, the communication unit 109 performs processes of transmitting and receiving image, voice signals to allow a videophone real-time conversation to be performed between the local terminal 100 and the remote terminal 200. That is to say, the communication unit 109 transmits camera-captured images obtained by the image input unit 101 and voice signals obtained by the voice input unit 102 to the remote terminal 200. Moreover, the communication unit 109 receives, from the remote terminal 200, camera-captured images obtained by the image input unit 201 of the remote terminal 200 and voice signals obtained by the voice input unit 202 of the remote terminal 200, and outputs the camera-captured images and the voice signals through the image displaying unit 112 and the voice output unit 113 of the local terminal 100.

The processes of transmitting and receiving images, voices are continuously performed in parallel to and independently from processes of semantic analyses of utterances in voice signals.

Information output from the application executing part 108 is input into the response-information generating part 110, and the response-information generating part 110 generates response information that will be presented to the user.

For example, the response-information generating part 110 generates output information of weather forecast information (voice information, image information).

The response information contains at least one of graphical user interface (GUI) screen-displayed information as an image or voice output information as a voice.

Note that in a case where the response information is output as a voice, the voice synthesizing part 111 of the response-information generating part 110 performs a voice synthesizing process. Text information that is the response information to the user is generated by, for example, the application executing part 108 or the response-information generating part 110. The text information is input into the voice synthesizing part 111. The voice synthesizing part 111 performs a voice synthesizing process (text-to-speech (TTS)) of converting the text information into a voice signal.

The image displaying unit 112 includes, for example, a display, such as a liquid crystal display (LCD), an organic electro luminescence (EL) display, or the like, a projector that performs projection display, or the like. The image displaying unit 112 performs a process of displaying an image that contains the response information generated by the response-information generating part 110 on the basis of a result of execution by the application executing part 108. For example, the image displaying unit 112 performs a GUI screen display.

The voice output unit 113 includes a speaker. The voice output unit 113 outputs a voice signal that contains response information generated by the response-information generating part 110 on the basis of a result of execution by the application executing part 108.

Note that the image displaying unit 112 and the voice output unit 113 output images captured by the image input unit 201 of the remote terminal 200 and voices obtained by the voice input unit 202 of the remote terminal 200 in addition to output of information on the result of application execution.

That is to say, the image displaying unit 112 and the voice output unit 113 output responses as results of processes based on results of voice recognition of user utterances, and also perform processes of outputting images, voices that are received from the other terminal, similarly as videophones.

Note that the block diagram illustrated in FIG. 4 illustrates only a main configuration of the local terminal 100, the remote terminal 200. The main configuration is used for the processes of the present disclosure. In addition to the configuration illustrated in FIG. 4, each terminal includes components of a basic information processing device, such as a storage unit that stores data, input units operated by a user, switches, a power source, and the like.

[3. As to Process Sequence Performed by Information Processing Device]

Next, a process sequence performed by the information processing device will be explained.

Figure 5:
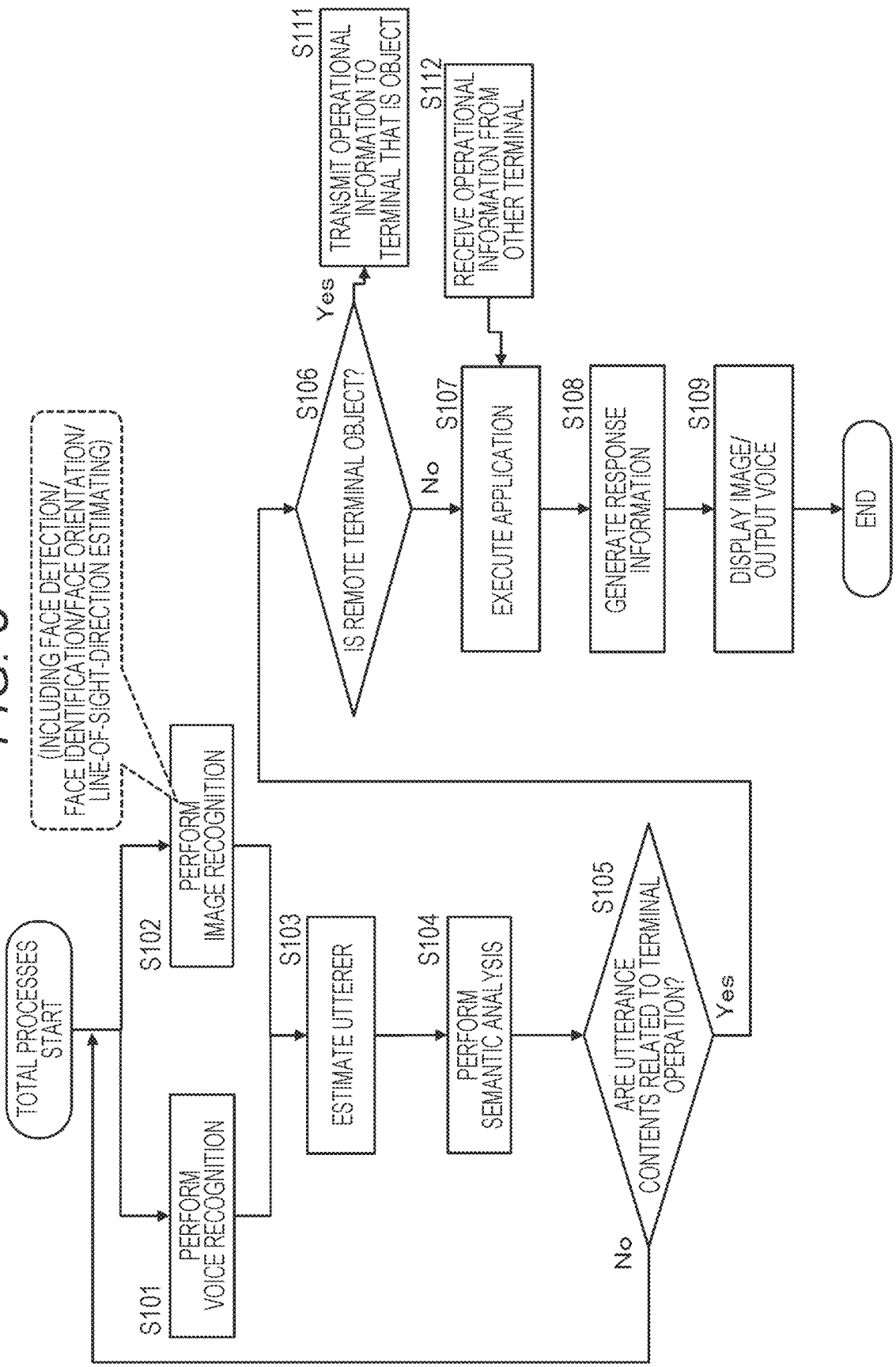
FIG. 5 is a diagram that illustrates a flowchart that illustrates a process sequence performed by the information processing device.

The process sequence performed by the information processing device will be explained with reference to a flowchart illustrated in FIG. 5. The flowchart illustrated in FIG. 5 is a process sequence performed by the local terminal 100 that has been explained with reference to FIG. 4. Note that a similar process is performed by the remote terminal 200.

Note that the processes that follow the flowchart illustrated in FIG. 5 may be performed, for example, according to programs stored in the storage unit of the local terminal 100 that includes the information processing device. For example, the processes according to the flowchart illustrated in FIG. 5 may be performed as processes performed by programs executed by a processor, such as a central processing unit (CPU) or the like, that has a program execution function.

Hereinafter, a process of each step in the flowchart illustrated in FIG. 5 will be explained.

(Steps S101 to S102)

First, in steps S101 and S102, a voice recognition process and an image recognition process are performed.

The voice recognition part 104 performs the voice recognition process in step S101. The voice recognition part 104 converts a voice signal input from the voice input unit 102 into text data that contains a plurality of words that corresponds to utterance contents of the voice signal. Note that in the voice recognition process in step S101, the voice recognition part 104 also performs a "sound-source-direction estimating process" that estimates a direction of a sound source, a "voice-section detection process" that detects sections of input voice signals where voices exist, and a "sound-source extraction process" that extracts a voice signal that corresponds to a sound-source direction and a voice section on the basis of information on the sound-source direction and the voice section (a signal emitted from the sound source).

The image recognition part 103 performs the image recognition process in step S102. The image recognition part 103 performs an analysis of camera-captured image signals input from the image input unit 101. The image recognition part 103 also performs, for example, a "face-area detection process" that detects a face area in an image, a "face identification process" that identifies a face, a "face-orientation estimating process" that estimates an orientation of the face, and a "line-of-sight-direction estimating process" that estimates a line-of-sight direction.

(Step S103)

Next, in step S103, an utterer estimating process is performed.

The process is a process performed by the information synthesizing part 105. An image recognition result generated by the image recognition part 103 is input into the information synthesizing part 105. That is to say, an image analysis result that contains information on an identity of a face in a face image contained in a captured image, an orientation of the face, and a line-of-sight direction is input into the information synthesizing part 105. Moreover, a voice recognition result generated by the voice recognition part 104 is input into the information synthesizing part 105. That is to say, a voice recognition result that contains a direction and a voice section of an input voice signal, a voice signal, and the like is input into the information synthesizing part 105.

On the basis of the input information, the information synthesizing part 105 estimates a user who is an utterer that corresponds to a result of voice recognition of a user utterance.

(Step S104)

Next, in step S104, a semantic-analysis process is performed.

The process is a process performed by the semantic-analysis part 106. Text information that corresponds to the user utterance is input into the semantic-analysis part 106. The text information that corresponds to the user utterance is the result of voice recognition by the voice recognition part 105. The semantic-analysis part 106 uses a technique, such as natural language processing or the like, to analyze a meaning of the utterance intended by the user. For example, the semantic-analysis part 106 has a natural language understanding function, such as natural language understanding (NLU) or the like. From text data, the semantic-analysis part 106 estimates intent of the user utterance and entity information (entity). The entity information (entity) includes meaningful elements (significant elements) contained in the utterance. If intent and entity information (entity) are correctly estimated and obtained from the user utterance, a correct process is performed for the user utterance.

(Step S105)

Next, in step S105, it is determined whether or not the user utterance is an utterance related to terminal operation. The terminal includes both the local terminal and the remote terminal.

The process is a process performed by the part 107 that determines a terminal that is an object of operation. A result of the analysis by the semantic-analysis part 106, that is to say the utterance intent of the user utterance, a result of the semantic analysis of the user utterance, is input into the part 107 that determines a terminal that is an object of operation. On the basis of the input information, the part 107 that determines a terminal that is an object of operation determines whether or not the user utterance is an utterance related to terminal operation.

In a case where it is determined that the user utterance is related to terminal operation, step S106 is performed. Alternatively, in a case where it is determined that the user utterance is not related to terminal operation, steps S101 to S102 are performed again.

(Step S106)

In a case where in step S105, it is determined that the user utterance is related to terminal operation, step S106 is performed. In step S106, it is determined whether a terminal that is an object of operation in the user utterance is the local terminal or the remote terminal.

The process is also a process performed by the part 107 that determines a terminal that is an object of operation. On the basis of the result of the analysis by the semantic-analysis part 106, the part 107 that determines a terminal that is an object of operation determines whether a terminal that is an object of operation in the user utterance is the local terminal or the remote terminal.

The determination processes of steps S105 to S106, that is to say (a) the determination process that determines whether or not a user utterance is related to terminal operation, and (b) the determination process that determines whether a terminal that is an object of operation in the user utterance is the local terminal or the remote terminal are performed on the basis of the result of the analysis of the user utterance analyzed by the semantic-analysis part 106. A specific example of these processes will be explained later.

In a case where in step S106, it is determined that a terminal that is an object of operation in the user utterance is the local terminal, step S107 is performed.

Alternatively, in a case where it is determined that a terminal that is an object of operation in the user utterance is the remote terminal, step S111 is performed.

(Steps S107 to S109)

In a case where in the determination process in step S106, it is determined that a terminal that is an object of operation in the user utterance is the local terminal, step S107 is performed.

In step S107, the application executing part 108 of the local terminal performs a process. In a case where in the determination process in step S106, it is determined that a terminal that is an object of operation in the user utterance is the local terminal, the part 107 of the local terminal that determines a terminal that is an object of operation outputs the intent of the user utterance, the result of the semantic analysis of the user utterance that are the result of the analysis by the semantic-analysis part 106 into the subsequent application executing part 108.

The application executing part 108 performs an application process that accords with the intent of the user utterance, the result of the semantic analysis of the user utterance that are the result of the analysis by the semantic-analysis part 106. For example, in a case where the user utterance is an utterance that asks about weather forecast, the application executing part 108 obtains weather forecast information from a weather-information providing server. Furthermore, for example, in a case where the user utterance is an utterance that requests face registration, the application executing part 108 performs processes that accord with the intent of the user utterance, such as starting a process of registration of a face contained in a camera-captured image.

Note that these application-based processes are performed as processes accompanied by a response-information generating process in step S108, and an image displaying process and a voice output process in step S109. That is to say, information output from the application executing part 108 is input into the response-information generating part 110, and the response-information generating part 110 generates response information that will be presented to the user. For example, the response-information generating part 110 generates output information of weather forecast information (voice information, image information).

The image displaying unit 112 performs a process of displaying image information generated by the response-information generating part 110. The voice output unit 113 performs a process of outputting voice information generated by the response-information generating part 110.

(Step S111)

Alternatively, in a case where in the determination process in step S106, it is determined that a terminal that is an object of operation in the user utterance is the remote terminal, step S111 is performed.

In step S111, operational information is transmitted to the terminal that is an object of operation, that is to say the remote terminal. Specifically, the intent of the user utterance and the result of the semantic analysis of the user utterance that have been generated as the result of the process of an analysis of the user utterance analyzed by the semantic-analysis part 106 are transmitted to the remote terminal through the communication unit 109.

The remote terminal 200 receives the intent of the user utterance and the result of the semantic analysis of the user utterance through the communication unit 209. The remote terminal 200 inputs the received information into the application executing part 208 on the remote-terminal-200 side. The application executing part 208 of the remote terminal 200 performs an application process that accords with the intent of the user utterance and the result of the semantic analysis of the user utterance. For example, in a case where the user utterance is an utterance that requests face registration on the remote-terminal-200 side, the application executing part 208 performs processes that accord with the intent of the user utterance, such as starting a process of registration of a face contained in a camera-captured image input from the image input unit 201 of the remote terminal 200.

(Step S112)

A process in step S112 is a process of inputting operational information from the other terminal (remote terminal).

For example, an utterance of a remote-side user input into the remote terminal 200 is analyzed by the semantic-analysis part 206 of the remote terminal 200. In a case where on the basis of a result of the analysis, the part 207 of the remote terminal 200 that determines a terminal that is an object of operation determines that the user utterance requests operation of the local terminal, the result of the analysis by the semantic-analysis part 206, that is to say intent of the remote-terminal-side user utterance and a result of the semantic analysis of the remote-terminal-side user utterance, is transmitted to the local terminal 100 through the communication unit 209.

The local terminal 100 receives the intent of the user utterance of the remote-terminal-side user and the result of the semantic analysis of the user utterance of the remote-terminal-side user, from the remote terminal 200 through the communication unit 109. The local terminal 100 inputs the received information into the application executing part 108 on the local-terminal-100 side. The application executing part 108 of the local terminal 100 performs an application process that accords with the intent of the remote-terminal-side user utterance and the result of the semantic analysis of the remote-terminal-side user utterance.

As described above, on the basis of a result of a semantic analysis of a user utterance, both the local terminal and the remote terminal determine which of the terminals from which the user utterance requests operation, and performs a process of transmitting the result of a semantic analysis of the user utterance to a terminal that is an object of the request for operation.

Note that in parallel with the processes that follow the flowchart illustrated in FIG. 5, images and voices are transmitted and received between the local terminal 100 and the remote terminal 200, similarly as common videophones, and a videophone conversation is performed between the local-side user and the remote-side user.

[4. As to Specific Example of Processes of Determining Whether or not User Utterance Requests Process from Terminals, and Determining which of Terminals from which User Utterance Requests Process]

Next, a specific example of processes of determining whether or not a user utterance requests a process from the terminals, and determining which of the terminals from which the user utterance requests the process will be explained with reference to FIG. 6 and some of the drawings.

In steps S105 and S106 in the flowchart in FIG. 5, the part 107 that determines a terminal that is an object of operation performs processes of determining whether or not a user utterance is an utterance related to terminal operation, and in a case where the user utterance is an utterance related to terminal operation, determining whether a terminal that is an object of operation is the local terminal or the remote terminal.

The part 107 that determines a terminal that is an object of operation performs the determination processes described above on the basis of a result of an analysis by the semantic-analysis part 106, that is to say utterance intent of the user utterance and a result of a semantic analysis of the user utterance. A specific example of the determination processes will be explained with reference to FIG. 6 and some of the drawings.

Figure 6:
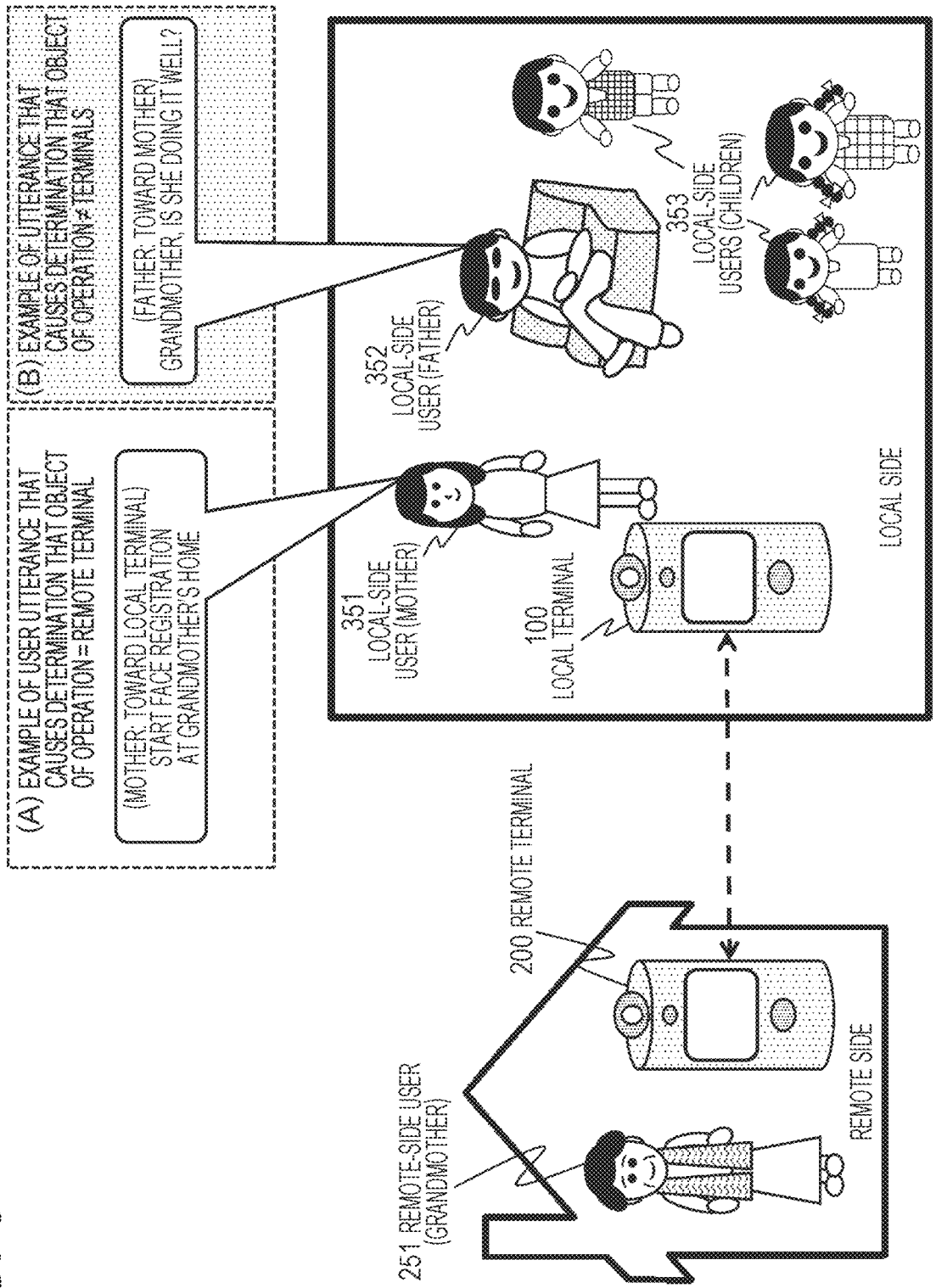
FIG. 6 is a diagram that illustrates a specific example of processes of determining whether or not a user utterance is an utterance related to terminal operation, and determining which of terminals from which the utterance requests the process.

The example illustrated in FIG. 6 is an example in which the determination processes are performed for user utterances made by each of a plurality of users on a local side.

As illustrated in FIG. 6, the local terminal 100 is on the local side, and the remote terminal 200 is on a remote side. The local terminal 100 communicates with the remote terminal 200.

On the local side, local-side users that include a mother 351, a father 352, and a plurality of children 353 are. On the other hand, on the remote side, a remote-side user that is a grandmother 251 is.

The local-side user (mother) 351 intends to request operation from the remote terminal 200 while having a videophone conversation with the remote-side user (grandmother) 251.

At the same time, the local-side user (father) 352 and the local-side users (children) 353 have a conversation between the local-side users.

All these user utterances on the local side are input into the voice input unit (microphone) 102 of the local terminal 100. Similarly as videophones, all these utterances are transmitted intact to the remote terminal 200, and output through the voice output unit (speaker) 213 of the remote terminal 200.

Moreover, on the basis of a result of an analysis by the semantic-analysis part 106, that is to say utterance intent of a user utterance and a result of a semantic analysis of the user utterance, the part 107 of the local terminal 100 that determines a terminal that is an object of operation performs following determination processes for all the user utterances on the local side.

(a) whether or not a user utterance is related to terminal operation (b) whether a terminal that is an object of operation in the user utterance is the local terminal or the remote terminal FIG. 6 illustrates two kinds of following examples of utterances.

(A) An example of a user utterance that causes a determination that an object of operation=the remote terminal A user utterance (mother)="Start face registration at grandmother's home"

(B) An example of a user utterance that causes a determination that an object of operation≠the terminals A user utterance (father)="Grandmother, is she doing it well?"

These two utterances each contain an expression that means the remote side. The expression that means the remote side is the "grandmother's home" or the "grandmother". However, the user utterance of (A) contains an expression (words) "face registration" related to a process that can be performed by the terminals. On the other hand, the user utterance of (B) does not contain an expression (words) related to a process that can be performed by the terminals.

On the basis of results of semantic analyses of the two user utterances, the semantic-analysis part 106 of the local terminal 100 and the part 107 of the local terminal 100 that determines a terminal that is an object of operation perform following processes.

From the "grandmother's home" and the "face registration" that are contained in the user utterance of (A), it is determined that intent of the user utterance is a request to the remote terminal 200 for a face registration process. The semantic-analysis result is transmitted to the remote terminal 200.

From the "grandmother" and the "is she doing it well" that are contained in the user utterance of (B), it is determined that intent of the user utterance is not a request to the terminals for a process. The semantic-analysis result is disregarded.

Note that in the examples of user utterances illustrated in FIG. 6, (A) an example of a user utterance that causes a determination that an object of operation=the remote terminal a user utterance (mother)="Start face registration at grandmother's home"

the user utterance contains an expression "grandmother's home" that means the remote side. Therefore, it is determined that the user utterance is a request to the remote terminal 200 for a process.

For example, in a case where a user utterance such as a following utterance is made, a user utterance (mother)="Start face registration"

In a case where the user utterance is made, the user utterance does not contain an expression that means the remote side. In such a case, the part 107 that determines a terminal that is an object of operation determines that the user utterance is a request to the local terminal 100 for a process, and starts face registration with an application started by the application executing part 108 of the local terminal 100.

Figure 7:
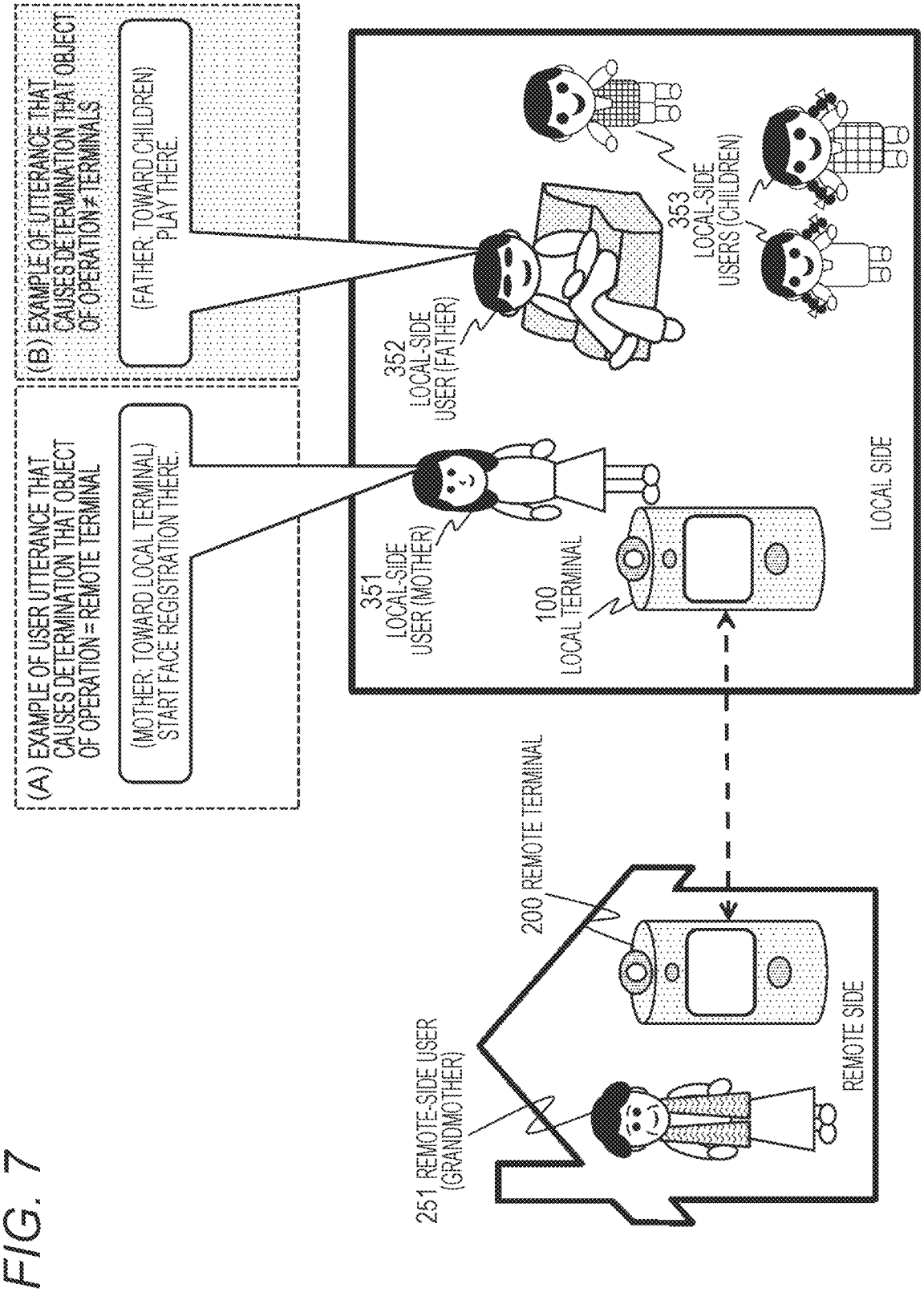
FIG. 7 is a diagram that illustrates a specific example of processes of determining whether or not a user utterance is an utterance related to terminal operation, and determining which of terminals from which the utterance requests the process.

An example illustrated in FIG. 7 is in circumstances similar to the circumstances in FIG. 6. The example illustrated in FIG. 7 is an example in which determination processes are performed for user utterances made by each of a plurality of users on the local side.

FIG. 7 illustrates two kinds of following examples of utterances.

(A) An example of a user utterance that causes a determination that an object of operation=the remote terminal A user utterance (mother)="Start face registration there"

(B) An example of a user utterance that causes a determination that an object of operation≠the terminals A user utterance (father)="Play there"

These two utterances each contain an expression "there" that means the remote side. However, the user utterance of (A) contains an expression (words) "face registration" related to a process that can be performed by the terminals. On the other hand, the user utterance of (B) does not contain an expression (words) related to a process that can be performed by the terminals.

On the basis of results of semantic analyses of the two user utterances, the semantic-analysis part 106 of the local terminal 100 and the part 107 of the local terminal 100 that determines a terminal that is an object of operation perform following processes.

From the "there" and the "face registration" that are contained in the user utterance of (A), it is determined that intent of the user utterance is a request to the remote terminal 200 for a face registration process. The semantic-analysis result is transmitted to the remote terminal 200.

From the "there" and the "play" that are contained in the user utterance of (B), it is determined that intent of the user utterance is not a request to the terminals for a process. The semantic-analysis result is disregarded.

Figure 8:
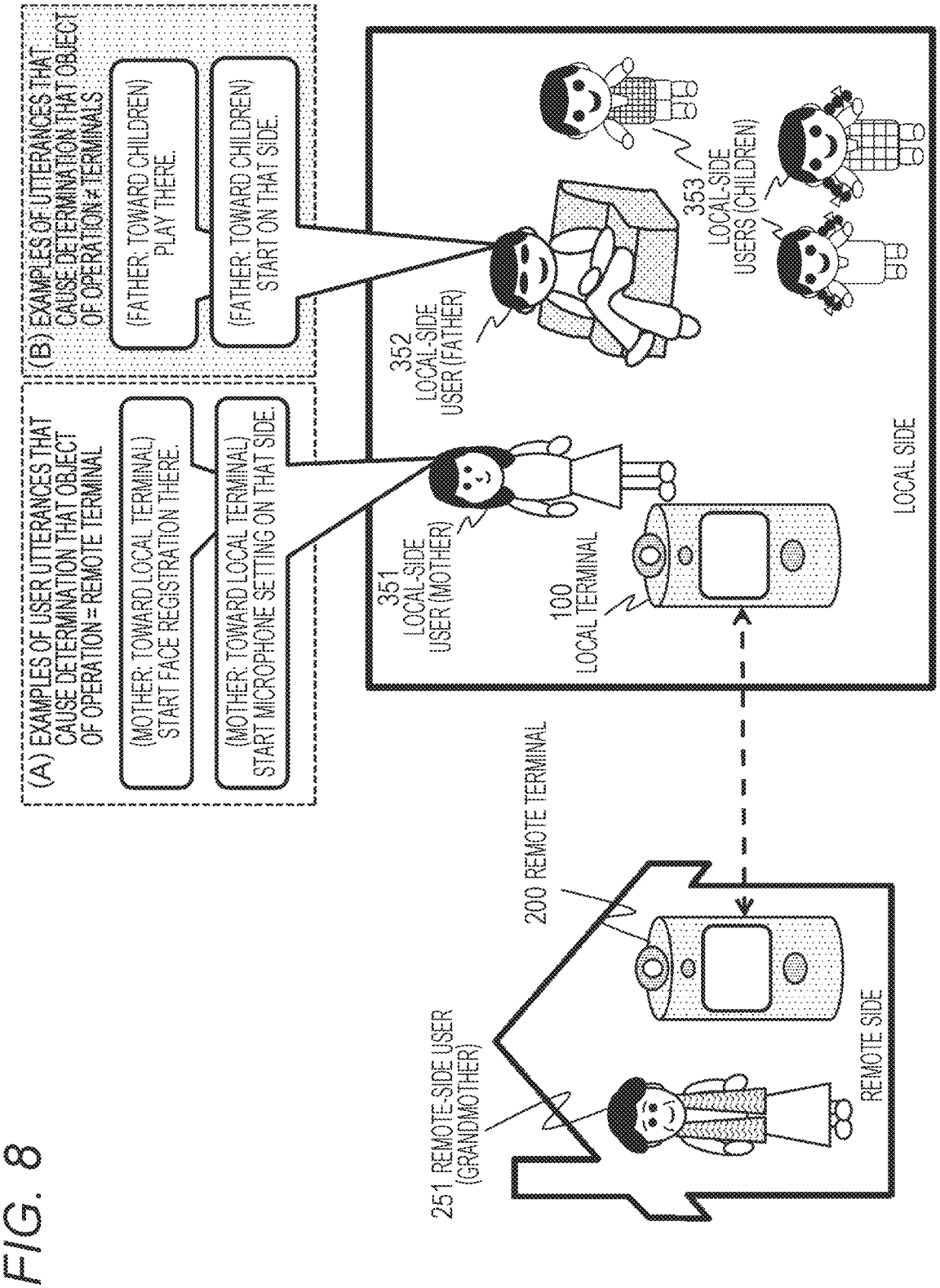
FIG. 8 is a diagram that illustrates a specific example of processes of determining whether or not a user utterance is an utterance related to terminal operation, and determining which of terminals from which the utterance requests the process.

An example illustrated in FIG. 8 is in circumstances similar to the circumstances in FIG. 6. The example illustrated in FIG. 8 is an example in which determination processes are performed for user utterances made by each of a plurality of users on the local side.

FIG. 8 illustrates two kinds of following examples of utterances.

(A) Examples of user utterances that cause a determination that an object of operation=the remote terminal (a1) A user utterance (mother)="Start face registration there"

(a2) A user utterance (mother)="Start microphone setting on that side"

(B) Examples of user utterances that cause a determination that an object of operation≠the terminals (b1) A user utterance (father)="Play there"

(b2) A user utterance (father)="Start on that side"

Each of utterances (a1) and (b1) is an utterance that has been explained with reference to FIG. 7. After these utterances, the utterances (a2) and (b2) are made.

These two utterances (a2) and (b2) each contain an expression "that side" that means the remote side. However, the user utterance of (a2) contains an expression (words) "microphone setting" related to a process that can be performed by the terminals. It is determined that the user utterance of (a2) is a request to the terminal for a process.

On the other hand, the user utterance of (b2) also contains an expression (word) "start". There is a possibility that it is determined that the expression (word) "start" is a process that can be performed by the terminals.

In this case, using only a result of a semantic analysis by the semantic-analysis part 106 makes it difficult to determine whether or not the user utterance of (b2) is a request to the terminals for a process.

In such a case, the part 107 that determines a terminal that is an object of operation performs a determination process that uses a result of image recognition by the image recognition part 103. That is to say, a face orientation and a line-of-sight direction of the user (father) 352 who makes the user utterance (father)="Start on that side" are obtained. It is confirmed whether or not the face orientation and the line-of-sight direction are toward the local terminal 100.

In a case where the face orientation and the line-of-sight direction are toward the local terminal 100, it is determined that the user utterance of (b2) is a request to the terminals for a process. In a case where the face orientation and the line-of-sight direction are not toward the local terminal 100, it is determined that the user utterance of (b2) is not a request to the terminals for a process.

In the example illustrated in FIG. 8, a face orientation and a line-of-sight direction of the user (father) 352 who makes the user utterance (father)="Start on that side" are not toward the local terminal 100. Therefore, it is determined that the user utterance is not a request to the terminals for a process.

As described above, in the example illustrated in FIG. 8, the part 107 of the local terminal 100 that determines a terminal that is an object of operation uses the results of semantic analyses of the two user utterances of (a2) and (b2), and the image recognition result to perform following processes.

From the "that side" and the "microphone setting" that are contained in the user utterance of (a2), it is determined that intent of the user utterance is a request to the remote terminal 200 for a face registration process. The semantic-analysis result is transmitted to the remote terminal 200.

From the "that side" and the "start" that are contained in the user utterance of (b2), it is unclear whether or not intent of the user utterance is a request to the terminals for a process. However, from the image recognition result, it is determined that intent of the user utterance is not a request to the terminals for a process because a face orientation and a line-of-sight direction of the user (father) 352 who makes the utterance are not toward the local terminal 100. The semantic-analysis result is disregarded.

Moreover, note that the two following utterances are successively made in the present example.

(b1) A user utterance (father)="Play there"

(b2) A user utterance (father)="Start on that side"

As explained already with reference to FIG. 7, it is determined, on the basis of only a semantic-analysis result, that the former utterance (b1) of the two successive utterances is not a request to the terminals for a process. In such a case, a process of determining that the latter utterance (b2) is also highly likely not to be a request to the terminals for a process may be performed. The part 107 that determines a terminal that is an object of operation can also perform a determination process that uses such "context information of utterances".

As explained with reference to FIGS. 6 to 8, the part 107 that determines a terminal that is an object of operation performs processes of determining whether or not a user utterance is an utterance related to terminal operation, and in a case where the user utterance is an utterance related to terminal operation, determining whether a terminal that is an object of operation is the local terminal or the remote terminal.

The part 107 that determines a terminal that is an object of operation performs a determination process that uses a result of an analysis by the semantic-analysis part 106 and an image recognition result generated by the image recognition part 103.

An example of a process of analyzing a user utterance will be explained with reference to FIG. 9. The process of analyzing a user utterance is used to perform the determination processes based on a result of an analysis by the semantic-analysis part 106.

Figure 9:
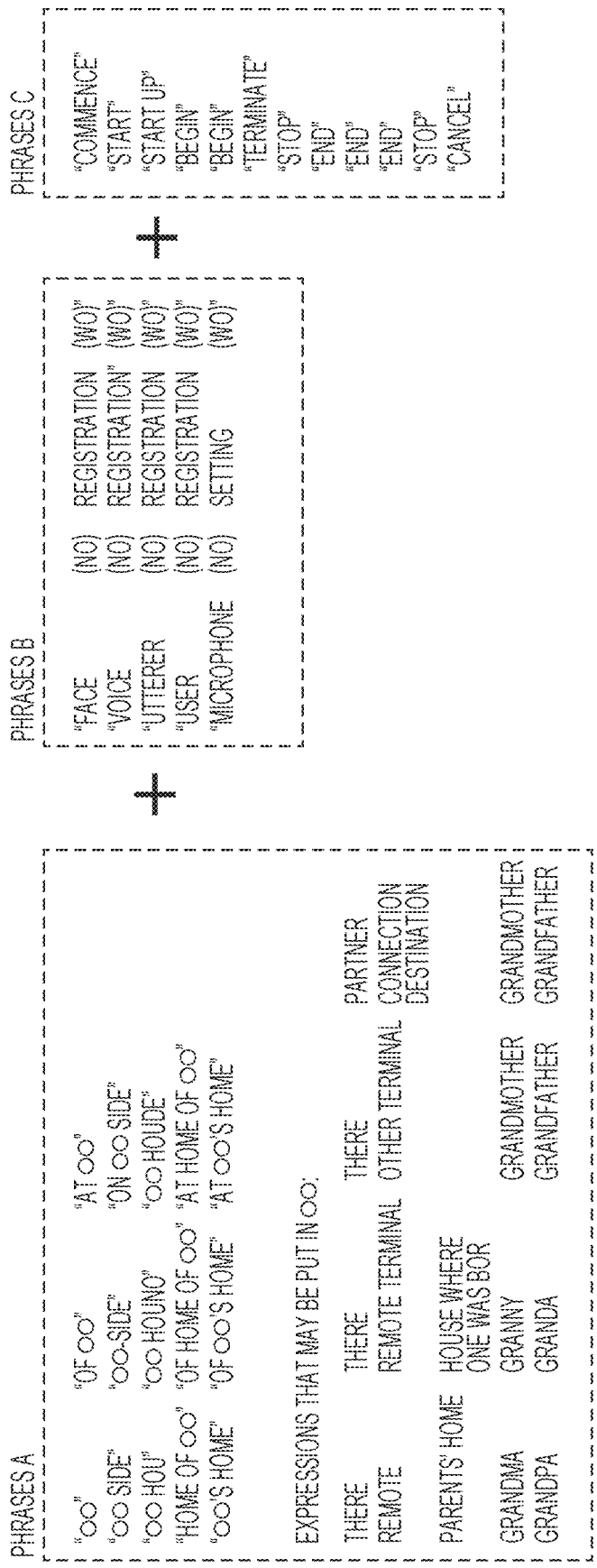
FIG. 9 is a diagram that illustrates an example of an analysis process of a user utterance. The analysis process of a user utterance is for processes of determining whether or not a user utterance is an utterance related to terminal operation, and determining which of terminals from which the utterance requests the process.

FIG. 9 illustrates an example of an analysis process by the semantic-analysis part 106. As illustrated in, for example, FIG. 9, in the analysis process by the semantic-analysis part 106, a user utterance is divided into a plurality of phrases. Here, the phrases are a "phrase A", a "phrase B", and a "phrase C", respectively.

The phrase A contains an expression that means the remote-terminal-200 side.

Any expression of "there" to "grandfather" described in a lower part of a phrase A column may be put in "00" within phrases A illustrated in the drawing.

The phrase B contains an expression that means a specific object of operation.

Note that particles, such as "(no)" and "(wo)", may be omitted in an utterance or a voice recognition result text.

The phrase C contains an expression that means specific action contents.

The part 107 that determines a terminal that is an object of operation determines that a user utterance that contains the three phrases:
a phrase A+a phrase B+a phrase C
is an utterance in which the remote terminal 200 is an object of operation.

For example, a user utterance="Start face registration there"

the user utterance is a combination of a phrase A+a phrase B+a phrase C, and the part 107 that determines a terminal that is an object of operation determines that the user utterance is an utterance in which the remote terminal 200 is an object of operation.

As described above, a configuration of the present disclosure allows instructions of a local-terminal-100-side user to make the remote terminal 200 perform various processes. As an example of the processes that the remote terminal 200 is made to perform, a process sequence in a case where a process of registration of a face of a remote-side user is performed will be explained with reference to FIG. 10.

Figure 10:
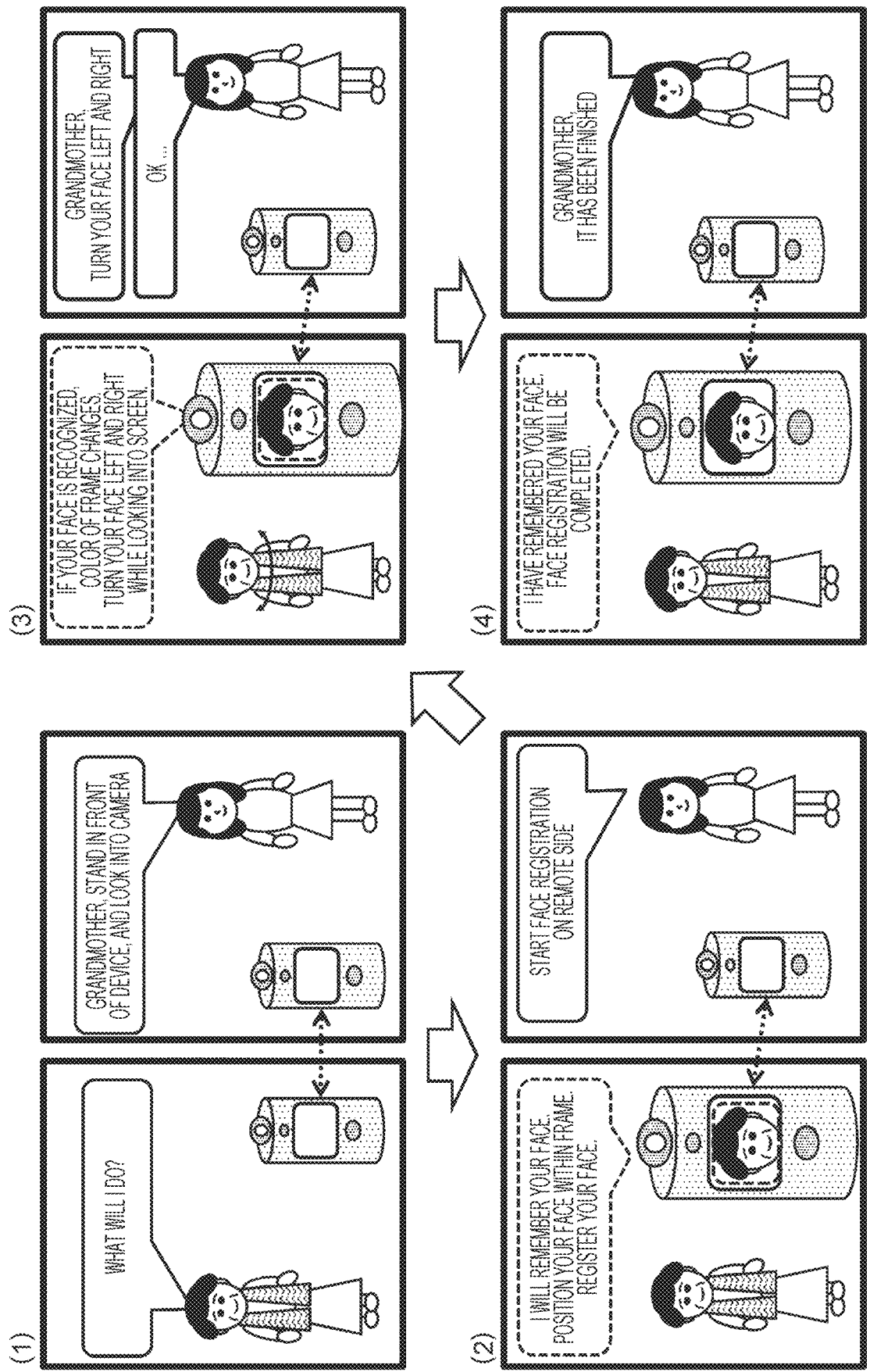
FIG. 10 is a diagram that illustrates a process sequence in a case where a face registration process is performed on a remote-terminal side according to an instruction from a local terminal.

FIG. 10 sequentially illustrates an example in which registration of a face of a remote-side user (grandmother) is performed on a remote-terminal-200 side with voice operation by a local-side user (mother) on a local-terminal-100 side. The processes proceed from (1) to (4).

In (1), face registration has not been started. A local-side user (mother) on a local-terminal-100 side and a remote-side user (grandmother) on a remote-terminal-200 side have a real-time conversation.

In (2), the local-side user (mother) on the local-terminal-100 side, a user utterance in which an object of operation is the remote terminal 200, that is to say a user utterance="Start face registration on the remote side"

The user utterance described above is input into the local terminal 100.

The semantic-analysis part 106 of the local terminal 100 performs a semantic analysis of the user utterance. The semantic-analysis part 106 inputs a result of the semantic analysis into the part 107 that determines a terminal that is an object of operation. On the basis of the semantic-analysis result, the part 107 that determines a terminal that is an object of operation determines that the user utterance is an utterance in which the remote terminal 200 is an object of operation. The part 107 that determines a terminal that is an object of operation transmits the semantic-analysis result to the remote terminal 200.

On the basis of the semantic-analysis result received from the local terminal 100, the remote terminal 200 starts an application that executes a face registration process, and starts a face registration process. A face registration function is started, and the remote terminal 200 outputs a voice guide "I will remember your face. Position your face within the frame. Register your face", and displays a face registration display that includes the frame that represents a position of the face.

In (3), the face registration is performed on the remote-terminal-200 side. The user (grandmother) on the remote-terminal-200 side positions her face within the frame within the face registration display. Consequently, the face is detected. Change in a color of the frame shows the user an appropriate detection of the face.

Thereafter, a voice guide such as "Turn your face left and right while looking into the screen" is output, and "Turn your face left and right" is displayed in the screen. In addition, in the screen, an orientation of the frame is automatically turned left and right. Consequently, the user is requested to turn her face left and right. Consequently, in addition to registration of the face that faces forward, the face turned left, or the face turned right is also registered. Moreover, in addition to the left and the right, the face in upward and downward orientations may be registered.

In (4), the face registration on the remote-terminal-200 side is completed.

The face registration function is automatically completed when the registration of the face in all necessary orientations is completed.

Furthermore, the face registration process on the remote-terminal side may be forcedly terminated by making such an utterance as "Stop face registration on the remote side" on the local-terminal-100 side.

[5. As to Process of Controlling Output of Privacy Information and Security Information]

Next, a process of controlling output of privacy information and security information in data output through the output units of the terminals will be explained.

Figure 11:
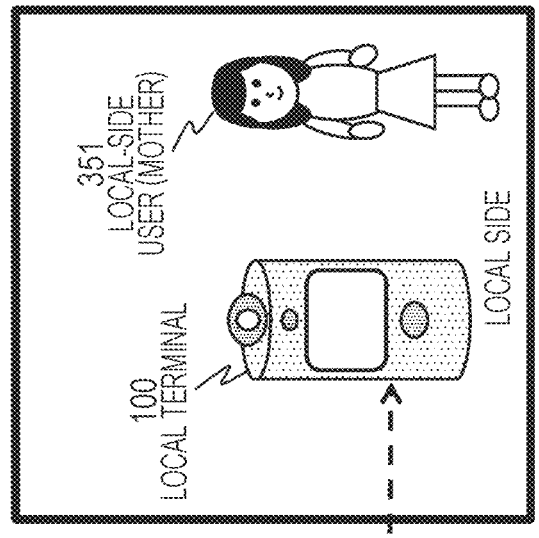
FIG. 11 is a diagram that illustrates an example of a process of controlling output of privacy information and security information.
Figure 11:
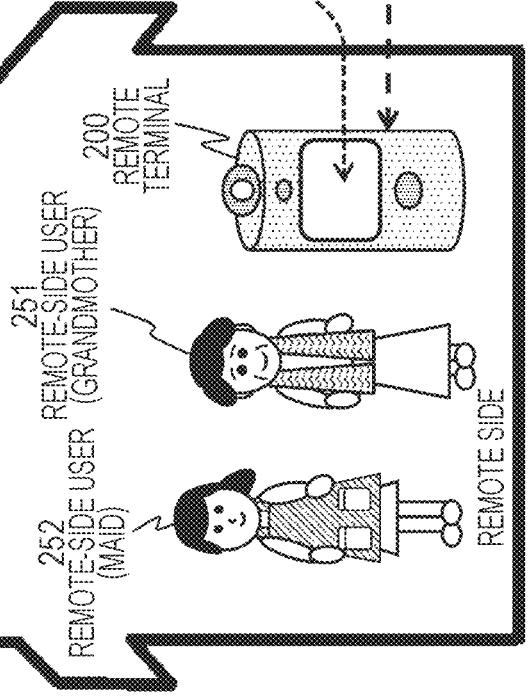

On a remote side on which the remote terminal 200 is disposed, an unrelated person who is not a member of the family may be, for example. FIG. 11 illustrates example circumstances where in addition to a remote-side user (grandmother) 251 who is a member of the family, a remote-side user (maid) 252 who is not a member of the family is.

In such a case, there is a possibility that privacy information or security information output through the output unit, such as the image displaying unit 212 or the like, of the remote terminal 200 is leaked to an unrelated person.

To prevent such an information leakage, the terminals (local terminal 100, remote terminal 200) control output information on the basis of a result of face identification, or the like. The face identification is based on camera-captured images input through the image input unit.

The control is performed by a data processing part that has an output-control-part function that controls output from the image displaying units 112 and 212, and the voice output units 113 and 213. Specifically, the response-information generating parts 110 and 210 and the application executing parts 108 and 208 have the output-control-part function. Any of these processing parts controls output information.

For example, in a case where a human identification process is performed on the basis of captured images input from the image input unit 101 and voice information input from the voice input unit 102, and a third user who is not a user who has been preliminarily registered is detected, output of privacy information and security information is not allowed. Furthermore, in a case where a user with registered attribute information "a registered user who is not a member of the family" that indicates an unrelated person who is not a member of the family is detected, output of privacy information and security information is not allowed, even if the user is a registered user.

Information output of which is not allowed is, for example, following information.

Privacy information: a date of birth, a place where one's family records are recorded, bank account information, a health insurance card number, a social insurance number, information regarding income, and the like Security information: credit card information, password information stored on the remote terminal, and the like—
Content information: schedule information of a calendar application, message information, and the like Output of these privacy information and security information is not allowed.

Note that data output of which is not allowed may be set and changed by a user.

An example illustrated in FIG. 11 illustrates an example of displays of (a) personal data and (b) schedule. For example, a date of birth, a personal number that are contained in (a) personal data are privacy information or security information, and are set as data 381 output of which is not allowed, that is to say non-displayed data 381. Similarly, specific schedule information in (B) schedule is set as the non-displayed data 381 by a user.

[6. As to Example of Process of Setting Terminal, Process of Information Registration of Terminal]

Next, an example of a process of setting the terminal and a process of information registration of the terminal will be explained. The process of setting the terminal and the process of information registration of the terminal are performed for the local terminal and the remote terminal.

(1) User Registration Process and Output Control

Attribute information (name and face/voice identification data) regarding terminal users, such as relatives who are mainly members of the family, can be registered in the storage unit of each of the local terminal 100 and the remote terminal 200.

Moreover, the local terminal 100, the remote terminal 200 have a configuration that allows attribute information (name and face/voice identification data) of maids, visiting caregivers, neighbors, and the like to be also registered in attribute information "registered users who are not members of the family" that indicates unrelated people who are not members of the family.

Note that each terminal automatically performs a human identification process on the basis of, for example, captured images input from the image input unit 101 and voice information input from the voice input unit 102, automatically detects and identifies a registered user, and automatically outputs information that accords with the user. For example, the process that has been explained with reference to FIG. 11 is automatically performed.

Information output of which is controlled includes output of recorded voices or synthesized voices, GUI screens, and the like.

(2) as to Information that can be Preliminarily Registered by User

Moreover, a local-side user can use the local terminal 100 to record words of voices output from the remote terminal 200 (system utterances), or input the words of voices in the form of texts.

Moreover, a local-side user can preliminarily register, in the local terminal 100, information regarding a remote-side user to whom the system utterances are output (=a person talked to), and information regarding a timing at which the person is talked to (setting of times that are basically days of the week/dates and times).

Figure 12:
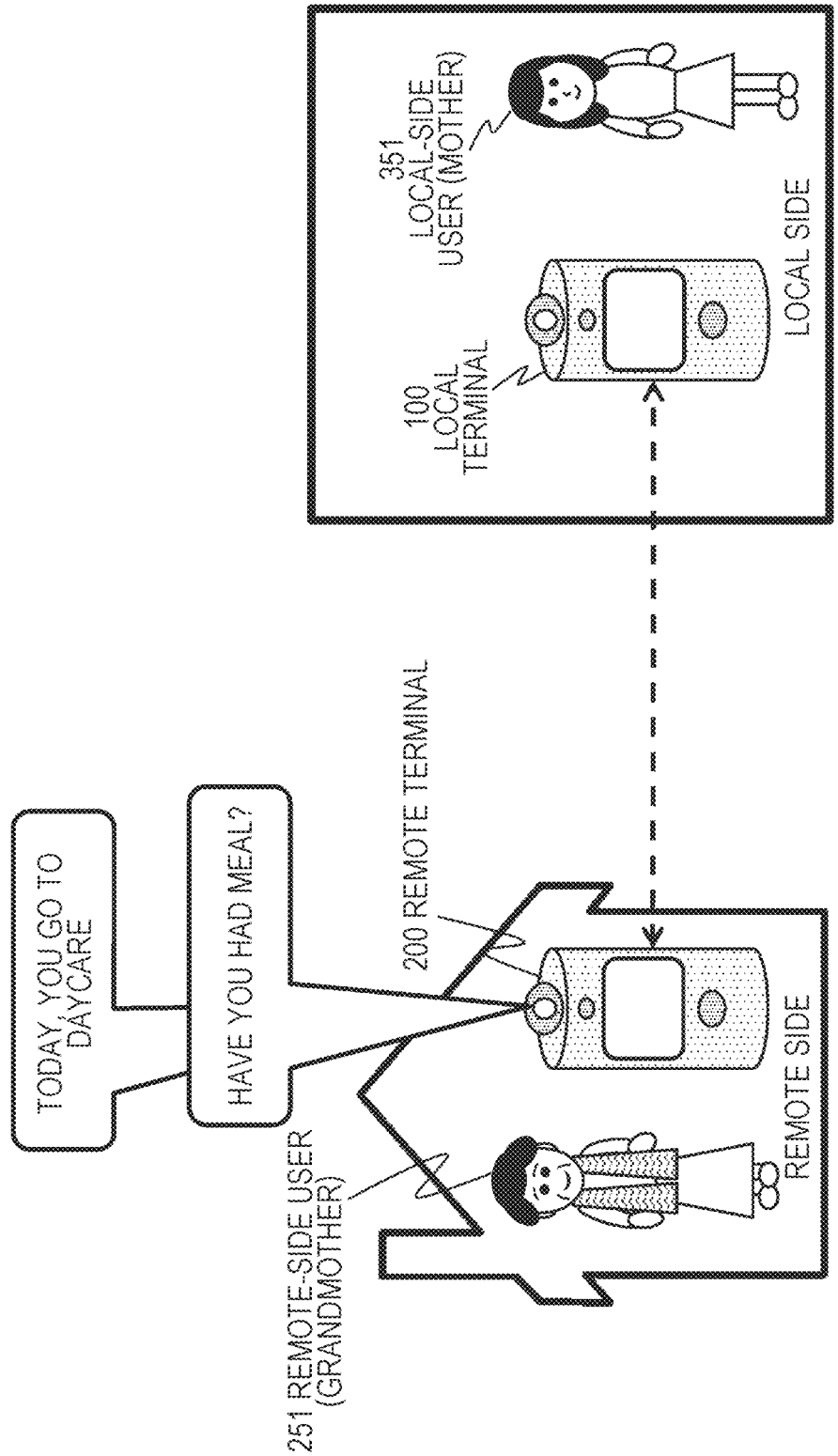
FIG. 12 is a diagram that illustrates examples of system utterances that a remote terminal outputs toward a remote-side user.

An example of the registered information will be explained with reference to FIG. 12.

A local-side user (mother 351) can use the local terminal 100 to record following words as voices output from the remote terminal 200 (system utterances), or input the words in the form of texts, as voices output from the remote terminal 200 (system utterances).

"Today, you go to daycare"

"Have you had a meal?"

For example, such utterances can be registered to allow the remote terminal 200 to output the utterances at preliminarily specified timings.

Moreover, utterances, such as "It is time to take your medicine", "Now you go to bed", and the like, can be registered to allow the remote terminal 200 to output the utterances at preliminarily specified timings.

Moreover, output of various system utterances as information that maids, caregivers, and the like on the remote side are informed of can be set. The various system utterances include "Since no one is going to be at home next week, a visit will not be needed", "Please receive medicines", "If some trouble occurs, please leave a message", and the like. Note that a configuration may be possible in which a plurality of these utterance contents is preliminarily registered, and a user performs a process of selecting items one by one that the user intends to use.

(3) as to Example of Processes of Reporting to, Informing User

The remote terminal 200 can send a collection (for example, a daily collection) of responses and everyday actions of a remote-side user that have been obtained on the remote side (for example, a summary of a log of sensing information that can be sensed) to the local terminal 100 to periodically report the collection of responses and everyday actions to a local-side user.

The reported information contains information on whether or not there have been answers to questions, information on whether or not aged relatives have been detected, and the like.

A local-side user may preliminarily set the remote terminal 200 to allow the remote terminal 200 to send information on abnormality or emergency to the local terminal 100 to inform the local-side user of the abnormality or the emergency, in a case where predefined conditions under which abnormality or emergency may occur are satisfied, such as in a case where there have not been answers to questions from the remote terminal 200, in a case where people have not been detected, or the like.

Furthermore, in a case where a registered user who is on the remote side and is not a member of the family, such as a visiting caregiver or the like, leaves a message, the remote-side registered user inputs the message into the remote terminal 200 to report the message to a local-terminal-100-side user or inform the local-terminal-100-side user of the message. The visiting caregiver registers a message by dialogue interaction (voice operation) with each terminal. A local-terminal-side user checks the message by dialogue interaction (voice operation) with each terminal.

Figure 13:
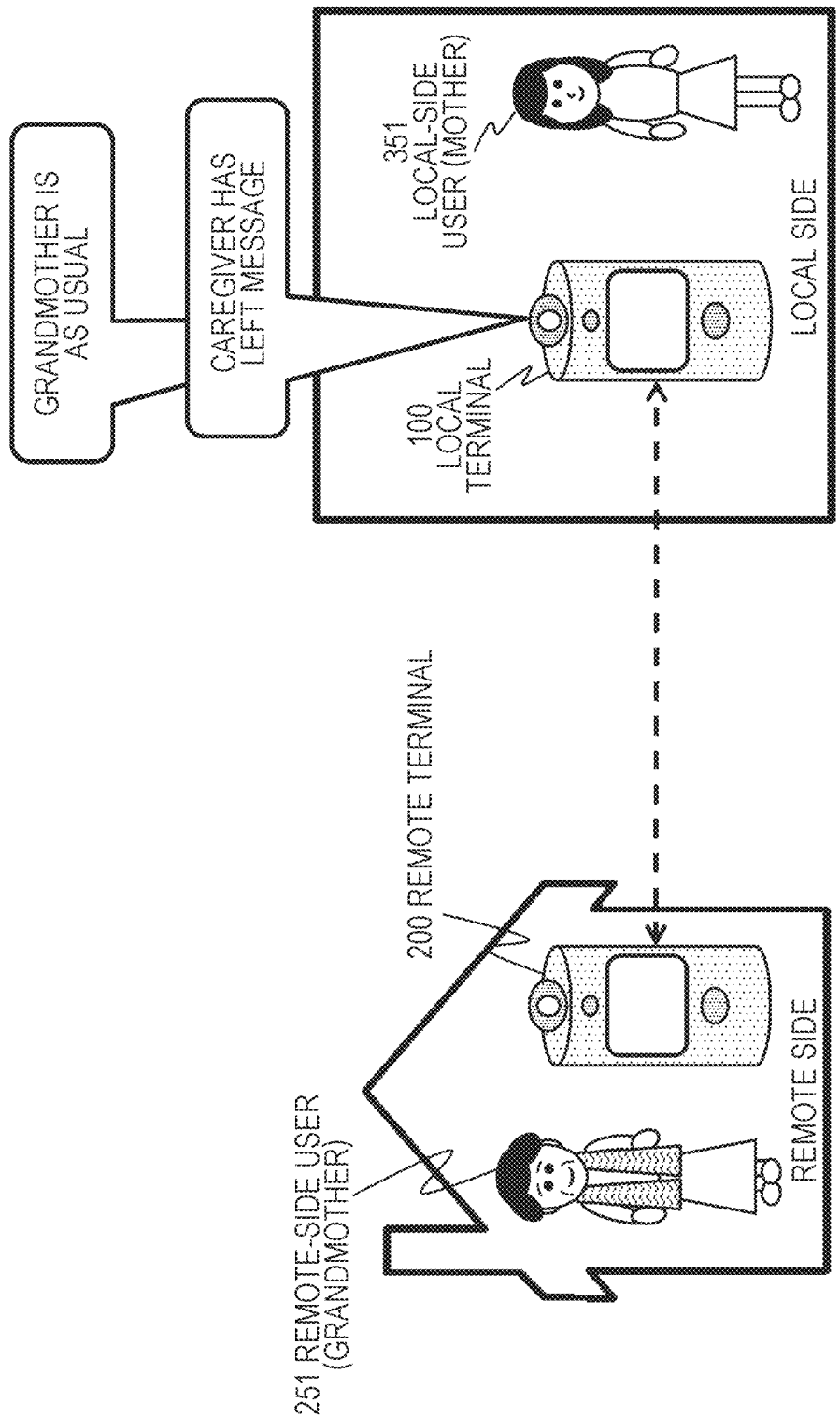
FIG. 13 is a diagram that illustrates an example of processes of outputting information on observation of a remote-side user, and outputting a message into a local terminal.

An example illustrated in FIG. 13 is an example in which responses and everyday actions of a remote-side user that have been obtained by the remote terminal 200 (for example, a summary of a log of sensing information that can be sensed) are transmitted to the local terminal 100, and are output by the local terminal 100.

A system utterance=Grandmother is as usual.

The local terminal 100 outputs the system utterance described above according to the information that has been obtained by the remote terminal 200.

Moreover, FIG. 13 illustrates an example of output of a system utterance.

The system utterance=The caregiver has left a message.

This example is an example in which in a case where a registered user who is on the remote side and is not a member of the family, such as a visiting caregiver or the like, leaves a message, the local terminal 100 outputs an informing message from the remote terminal 200.

[7. As to Configuration Example of Hardware of Information Processing Device]

Next, a configuration example of hardware of the information processing device that constitutes the local terminal and the remote terminal will be explained with reference to FIG. 14.

Figure 14:
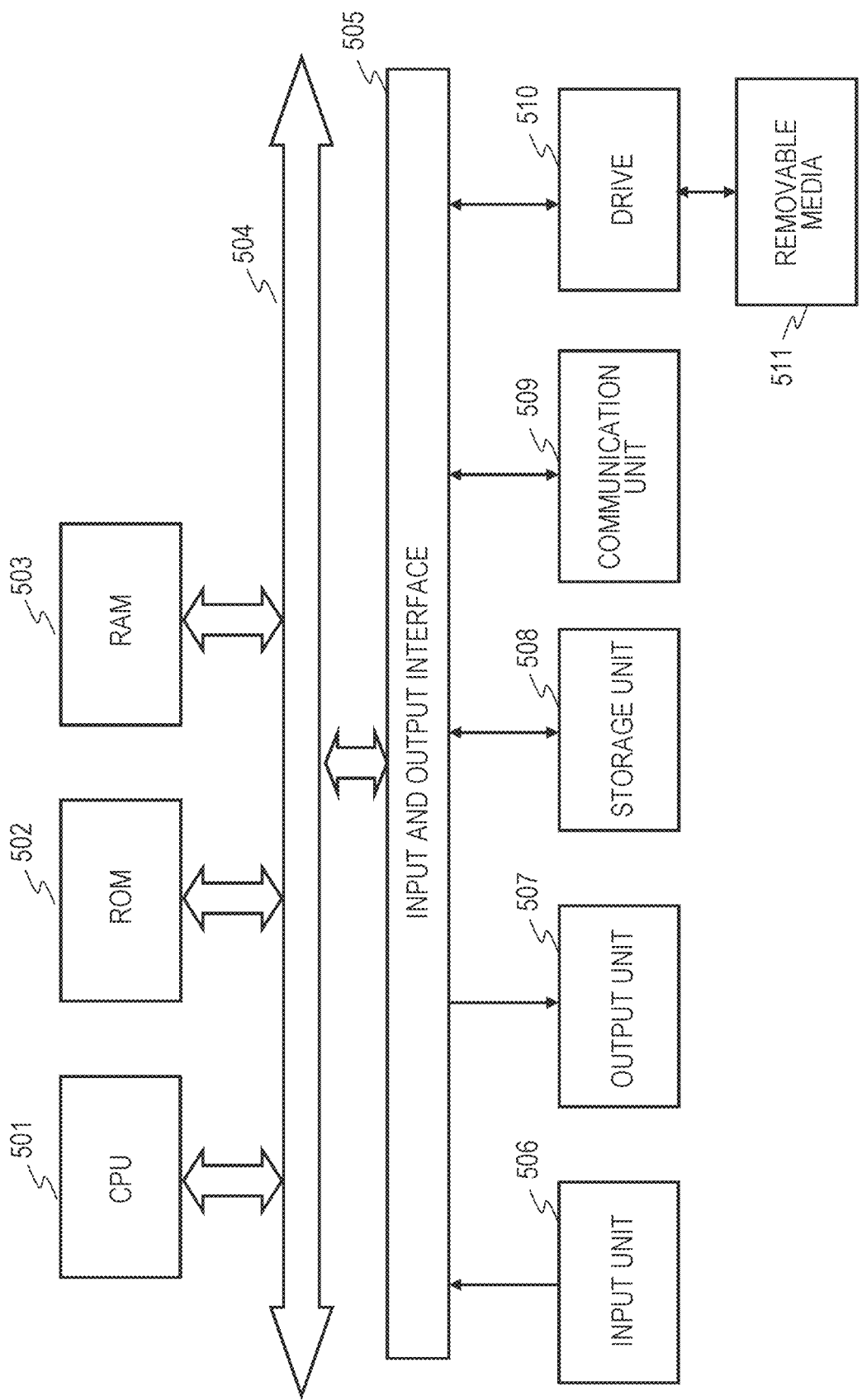
FIG. 14 is a diagram that illustrates a configuration example of hardware of the information processing device.

Hardware explained with reference to FIG. 14 is a configuration example of hardware of the information processing device that has been explained with reference to FIG. 4 and constitutes the local terminal and the remote terminal.

A central processing unit (CPU) 501 functions as a control part and a data processing part that perform various processes according to programs stored in a read only memory (ROM) 502 or a storage unit 508. For example, the processes that follow the sequence that has been explained in the above embodiments are performed. A random access memory (RAM) 503 stores programs executed by the CPU 501, data, and the like. The CPU 501, the ROM 502, and the RAM 503 are connected with each other through a bus 504.

The CPU 501 is connected with an input and output interface 505 through the bus 504. Input units 506 and output units 507 are connected with the input and output interface 505. The input units 506 include various switches, a keyboard, a mouse, a microphone, sensors, and the like. The output units 507 includes a display, a speaker, and the like. The CPU 501 performs various processes in response to an instruction input from the input units 506, and outputs results of the processes through the output units 507, for example.

The storage unit 508 connected with the input and output interface 505 includes, for example, a hard disk and the like, and stores programs executed by the CPU 501 and various data. The communication unit 509 functions as a unit that transmits and receives data communication through networks, such as Wi-Fi communication, Bluetooth (registered trademark) (BT) communication, the Internet, a local area network, and the like. The communication unit 509 communicates with external devices.

A drive 510 connected with the input and output interface 505 drives removable media 511, such as a magnetic disk, an optical disc, a magneto-optical disc, or a semiconductor memory, such as a memory card or the like, or the like, to record and read data.

[8. Summary of Configurations of the Present Disclosure]

Embodiments of the present disclosure have been explained in detail so far with reference to the specific embodiments. However, it is obvious that a person skilled in the art can modify or substitute the embodiments without departing from the gist of the present disclosure. That is to say, the present invention has been disclosed in the form of examples, and limitative interpretation of the present invention should not be made. To determine the gist of the present disclosure, the claims should be referred to.

Note that the technology disclosed in the present description may be configured as follows:

(1) An information processing device including:

a semantic-analysis part that performs a process of a semantic analysis of a user utterance; and a part that determines a terminal that is an object of operation, the part that determines a terminal that is an object of operation determining, on the basis of a semantic-analysis result generated by the semantic-analysis part, whether or not the user utterance requests a process from the information processing devices, and in a case where the user utterance requests a process from the information processing devices, determining which of the information processing devices from which the user utterance requests the process.

(2) The information processing device according to (1), in which the part that determines a terminal that is an object of operation determines whether a user utterance requests a process from a local terminal that includes the information processing device into which the user utterance is input, or requests a process from a remote terminal that communicates with the local terminal.

(3) The information processing device according to (2), in which the part that determines a terminal that is an object of operation verifies whether or not the user utterance contains an expression that means a remote place where the remote terminal is, or an expression that means a remote-side user who is at the remote place where the remote terminal is, and according to a result of the verification, determines whether or not the user utterance requests a process from the remote terminal.

(4) The information processing device according to (3), in which the part that determines a terminal that is an object of operation further verifies whether or not the user utterance contains an expression that corresponds to a process that can be performed by the terminals, and according to a result of the verification, determines whether or not the user utterance requests a process from the remote terminal.

(5) The information processing device according to any one of (1) to (4), in which the part that determines a terminal that is an object of operation, on the basis of an orientation of a face or a line-of-sight direction of a user who makes the user utterance, determines whether or not the user utterance requests a process from the information processing device.

(6) The information processing device according to any one of (1) to (5), in which in a case where the part that determines a terminal that is an object of operation determines that the user utterance requests a process from a local terminal that includes the information processing device into which the user utterance is input, the part that determines a terminal that is an object of operation makes an application executing part perform a process based on a result of a semantic analysis by the semantic-analysis part, or in a case where the part that determines a terminal that is an object of operation determines that the user utterance requests a process from a remote terminal that does not include the information processing device into which the user utterance is input, the part that determines a terminal that is an object of operation transmits a result of a semantic analysis by the semantic-analysis part to the remote terminal through a communication unit.

(7) The information processing device according to any one of (1) to (6), further including:

an image input unit into which a captured image is input;

a voice input unit into which an obtained voice is input; and a communication unit that transmits an image input into the image input unit, and a voice obtained by a voice obtaining unit to a remote terminal.

(8) The information processing device according to any one of (1) to (7), further including:

a communication unit that receives, from a remote terminal, a result of a semantic analysis of a remote-terminal-side user utterance; and an application executing part that performs a process based on the result of a semantic analysis of a remote-terminal-side user utterance that has been received through the communication unit.

(9) The information processing device according to any one of (1) to (8), further including:

an input-information recognition part that performs a human identification process based on input information; and an output control part that controls output information according to a result of the human identification by the input-information recognition part.

(10) The information processing device according to (9), in which the input-information recognition part includes at least one of an image recognition part that performs human identification by analyzing an image input from an image input unit, or a voice recognition part that performs human identification by analyzing a voice input from a voice input unit.

(11) An information processing system including a local terminal and a remote terminal, in which the local terminal includes:

a semantic-analysis part that performs a process of a semantic analysis of a user utterance input into the local terminal;

a part that determines a terminal that is an object of operation, the part that determines a terminal that is an object of operation determining, on the basis of a semantic-analysis result generated by the semantic-analysis part, whether or not the user utterance requests a process from the remote terminal; and a communication unit that, in a case where it is determined that the user utterance requests a process from the remote terminal, transmits the result of the semantic analysis by the semantic-analysis part to the remote terminal, and the remote terminal includes:

a communication unit that receives the result of the semantic analysis of the local-terminal-side user utterance; and an application executing part that performs a process based on the result of the semantic analysis of the local-terminal-side user utterance that has been received through the communication unit.

(12) The information processing system according to (11), in which the local terminal and the remote terminal are configured to mutually transmit and receive captured images and obtained voices.

(13) An information processing method that is performed in an information processing device, and in which a semantic-analysis part performs a process of a semantic analysis of a user utterance; and a part that determines a terminal that is an object of operation determines, on the basis of a semantic-analysis result generated by the semantic-analysis part, whether or not the user utterance requests a process from the information processing devices, and in a case where the user utterance requests a process from the information processing devices, determines which of the information processing devices from which the user utterance requests the process.

(14) An information processing method that is performed in an information processing system including a local terminal and a remote terminal, and in which the local terminal:

performs a process of a semantic analysis of a user utterance input into the local terminal;

performs a process of determining a terminal that is an object of operation, the process of determining a terminal that is an object of operation determining, on the basis of a semantic-analysis result of the semantic-analysis process, whether or not the user utterance requests a process from the remote terminal; and in a case where it is determined that the user utterance requests a process from the remote terminal, performs a process of transmitting the result of the semantic analysis by the semantic-analysis part to the remote terminal, and the remote terminal:

receives the result of the semantic analysis of the local-terminal-side user utterance; and performs a process based on the result of the semantic analysis of the local-terminal-side user utterance that has been received.

(15) A program that makes an information processing device perform information processing, the program:

making a semantic-analysis part perform a process of a semantic analysis of a user utterance; and making a part that determines a terminal that is an object of operation perform processes of determining, on the basis of a semantic-analysis result generated by the semantic-analysis part, whether or not the user utterance requests a process from the information processing devices, and in a case where the user utterance requests a process from the information processing devices, determining which of the information processing devices from which the user utterance requests the process.

Furthermore, the series of processes that has been explained in the description may be performed by hardware or software, or a combined configuration of hardware and software. In a case where software performs the processes, programs that store the process sequences may be installed into memory in a computer incorporated into dedicated hardware, and may be executed. Alternatively, in a case where software performs the processes, programs may be installed into a general-purpose computer that performs various processes, and may be executed. For example, the programs may be preliminarily stored in a storage medium. In addition to installing the programs into a computer from a storage medium, the programs may be received through networks, such as a local area network (LAN) and the Internet, and may be installed into a storage medium, such as a built-in hard disk or the like.

Note that the various processes described in the description are not only performed in time series according to the description, but also may be independently performed or may be performed in parallel with each other as necessary or according to processing ability of a device that performs the processes. Furthermore, the system in the present description is a logical combined configuration of a plurality of devices, and is not limited to a system that includes devices that are each a configuration and are in one housing.

INDUSTRIAL APPLICABILITY

As described above, a configuration of an embodiment of the present disclosure provides a device, a method that allow a remote terminal to perform a process on the basis of a local-terminal-side user utterance.

Specifically, there are, for example, a local terminal and a remote terminal. The local terminal performs a process of a semantic analysis of a user utterance input into the local terminal. On the basis of a result of the semantic analysis, the local terminal determines whether or not the user utterance is a request to the remote terminal for a process.

Moreover, in a case where the user utterance is a request to the remote terminal for a process, the local terminal transmits the result of the semantic analysis by a semantic-analysis part to the remote terminal. The remote terminal receives the result of the semantic analysis of the local-terminal-side user utterance, and performs a process based on the received result of the semantic analysis of the local-terminal-side user utterance.

The present configuration provides a device, a method that allow a remote terminal to perform a process on the basis of a local-terminal-side user utterance.

REFERENCE SIGNS LIST

10 Information processing device
11 Camera
12 Microphone
13 Displaying unit
14 Speaker
20 Server
30 External device
100 Local terminal
200 Remote terminal
101, 201 Image input unit
102, 202 Voice input unit
103, 203 Image recognition part
104, 204 Voice recognition part
105, 205 Information synthesizing part
106, 206 Semantic-analysis part
107, 207 Part that determines a terminal that is an object of operation
108, 208 Application executing part
109, 209 Communication unit
110, 210 Response-information generating part
111, 211 Voice synthesizing part
112, 212 Image displaying unit
113, 213 Voice output unit
501 CPU
502 ROM
503 RAM
504 Bus
505 Input and output interface
506 Input unit
507 Output unit
508 Storage unit
509 Communication unit
510 Drive
511 Removable media

The invention claimed is:

1. An information processing device comprising:
a semantic-analysis part that performs a process of a semantic analysis of a user utterance; and
a part that determines a terminal that is an object of operation, the part that determines a terminal that is an object of operation determining, on a basis of a semantic-analysis result generated by the semantic-analysis part, whether or not the user utterance requests a process from information processing devices, and in a case where the user utterance requests a process from the information processing devices, determining which of the information processing devices from which the user utterance requests the process,
wherein the part that determines a terminal that is an object of operation verifies whether or not the user utterance contains an expression that means a remote place where a remote terminal is, or an expression that means a remote-side user who is at the remote place where the remote terminal is, and according to a result of the verification, determines whether or not the user utterance requests a process from the remote terminal.

2. The information processing device according to claim 1,
wherein the part that determines a terminal that is an object of operation determines whether
a user utterance requests a process from a local terminal that includes the information processing device into which the user utterance is input, or
requests a process from a remote terminal that communicates with the local terminal.

3. The information processing device according to claim 2,
wherein the part that determines a terminal that is an object of operation further
verifies whether or not the user utterance contains an expression that corresponds to a process that can be performed by terminals, and according to a result of the verification,
determines whether or not the user utterance requests a process from the remote terminal.

4. The information processing device according to claim 1,
wherein the part that determines a terminal that is an object of operation,
on a basis of an orientation of a face or a line-of-sight direction of a user who makes the user utterance, determines whether or not the user utterance requests a process from the information processing devices.

5. The information processing device according to claim 1,
wherein in a case where the part that determines a terminal that is an object of operation
determines that the user utterance requests a process from a local terminal that includes the information processing device into which the user utterance is input, the part that determines a terminal that is an object of operation makes an application executing part perform a process based on a result of a semantic analysis by the semantic-analysis part, or in a case where the part that determines a terminal that is an object of operation
determines that the user utterance requests a process from a remote terminal that does not include the information processing device into which the user utterance is input, the part that determines a terminal that is an object of operation transmits a result of a semantic analysis by the semantic-analysis part to the remote terminal through a communication unit.

6. The information processing device according to claim 1, further comprising:
an image input unit into which a captured image is input;
a voice input unit into which an obtained voice is input; and
a communication unit that transmits an image input into the image input unit, and a voice obtained by a voice obtaining unit to a remote terminal.

7. The information processing device according to claim 1, further comprising:
a communication unit that receives, from a remote terminal, a result of a semantic analysis of a remote-terminal-side user utterance; and
an application executing part that performs a process based on the result of a semantic analysis of a remote-terminal-side user utterance that has been received through the communication unit.

8. The information processing device according to claim 1, further comprising:
an input-information recognition part that performs a human identification process based on input information; and
an output control part that controls output information according to a result of the human identification process by the input-information recognition part.

9. The information processing device according to claim 8,
wherein the input-information recognition part includes at least one of
an image recognition part that performs human identification by analyzing an image input from an image input unit, or
a voice recognition part that performs human identification by analyzing a voice input from a voice input unit.

10. An information processing system comprising:
a local terminal and a remote terminal, wherein the local terminal includes:
a semantic-analysis part that performs a process of a semantic analysis of a user utterance input into the local terminal;
a part that determines a terminal that is an object of operation, the part that determines a terminal that is an object of operation determining, on a basis of a semantic-analysis result generated by the semantic-analysis part, whether or not the user utterance requests a process from the remote terminal; and
a communication unit that, in a case where it is determined that the user utterance requests a process from the remote terminal, transmits the result of the semantic analysis by the semantic-analysis part to the remote terminal, and
the remote terminal includes:
a communication unit that receives the result of the semantic analysis of a local-terminal-side user utterance; and
an application executing part that performs a process based on the result of the semantic analysis of the local-terminal-side user utterance that has been received through the communication unit,
wherein the part that determines a terminal that is an object of operation verifies whether or not the user utterance contains an expression that means a remote place where a remote terminal is, or an expression that means a remote-side user who is at the remote place where the remote terminal is, and according to a result of the verification, determines whether or not the user utterance requests a process from the remote terminal.

11. The information processing system according to claim 10, wherein the local terminal and the remote terminal to mutually transmit and receive captured images and obtained voices.

12. An information processing method that is performed in an information processing device, and in which
a semantic-analysis part performs a process of a semantic analysis of a user utterance; and
a part that determines a terminal that is an object of operation determines, on a basis of a semantic-analysis result generated by the semantic-analysis part, whether or not the user utterance requests a process from information processing devices, and in a case where the user utterance requests a process from the information processing devices, determines which of the information processing devices from which the user utterance requests the process,
wherein the part that determines a terminal that is an object of operation verifies whether or not the user utterance contains an expression that means a remote place where a remote terminal is, or an expression that means a remote-side user who is at the remote place where the remote terminal is, and according to a result of the verification, determines whether or not the user utterance requests a process from the remote terminal.

13. An information processing method that is performed in an information processing system including a local terminal and a remote terminal, wherein:
the local terminal:
performs a process of a semantic analysis of a user utterance input into the local terminal;
performs a process of determining a terminal that is an object of operation, the process of determining a terminal that is an object of operation determining, on a basis of a semantic-analysis result of the semantic-analysis process, whether or not the user utterance requests a process from the remote terminal; and
in a case where it is determined that the user utterance requests a process from the remote terminal, performs a process of transmitting the result of the semantic analysis by the semantic-analysis part to the remote terminal,
the remote terminal:
receives the result of the semantic analysis of the local-terminal-side user utterance; and
performs a process based on the result of the semantic analysis of the local-terminal-side user utterance that has been received, and
a part that determines a terminal that is an object of operation verifies whether or not the user utterance contains an expression that means a remote place where the remote terminal is, or an expression that means a remote-side user who is at the remote place where the remote terminal is, and according to a result of the verification, determines whether or not the user utterance requests a process from the remote terminal.

14. A non-transitory storage medium encoded with instructions that, when executed by a computer, execute a method comprising:
making a semantic-analysis part perform a process of a semantic analysis of a user utterance; and
making a part that determines a terminal that is an object of operation perform processes of determining, on a basis of a semantic-analysis result generated by the semantic-analysis part, whether or not the user utterance requests a process from information processing devices, and in a case where the user utterance requests a process from the information processing devices, determining which of the information processing devices from which the user utterance requests the process,
wherein the part that determines a terminal that is an object of operation verifies whether or not the user utterance contains an expression that means a remote place where a remote terminal is, or an expression that means a remote-side user who is at the remote place where the remote terminal is, and according to a result of the verification, determines whether or not the user utterance requests a process from the remote terminal.

\* \* \* \* \*